(12) United States Patent
Reed et al.

(10) Patent No.: US 9,954,797 B2
(45) Date of Patent: Apr. 24, 2018

(54) PARALLEL DATA SWITCH

(71) Applicant: INTERACTIC HOLDINGS, LLC, Austin, TX (US)

(72) Inventors: Coke S. Reed, Austin, TX (US); David Murphy, Austin, TX (US)

(73) Assignee: Interactic Holdings, LLC, Austin, TX (US)

( * ) Notice: Subject to any disclaimer, the term of this patent is extended or adjusted under 35 U.S.C. 154(b) by 0 days.

(21) Appl. No.: 15/462,456

(22) Filed: Mar. 17, 2017

(65) Prior Publication Data

US 2017/0195252 A1    Jul. 6, 2017

Related U.S. Application Data

(63) Continuation of application No. 14/446,958, filed on Jul. 30, 2014, now Pat. No. 9,634,862, which is a continuation-in-part of application No. 13/072,612, filed on Mar. 25, 2011, now Pat. No. 9,479,458.

(51) Int. Cl.
*H04L 12/28* (2006.01)
*H04L 12/933* (2013.01)
*H04L 12/741* (2013.01)

(52) U.S. Cl.
CPC .......... *H04L 49/1523* (2013.01); *H04L 45/74* (2013.01)

(58) Field of Classification Search
CPC .................................................. H04L 49/1523
USPC ........................................................ 370/254
See application file for complete search history.

(56) References Cited

U.S. PATENT DOCUMENTS

| | | |
|---|---|---|
| 5,521,591 A | 5/1996 | Arora |
| 5,602,839 A | 2/1997 | Annapareddy |
| 6,088,356 A | 7/2000 | Hendel |
| 6,542,502 B1 | 4/2003 | Herring |
| 6,754,207 B1 | 6/2004 | Hesse |
| 2005/0008010 A1 | 1/2005 | Reed |

*Primary Examiner* — Shripal Khajuria

(57) ABSTRACT

An interconnect apparatus enables improved signal integrity, even at high clock rates, increased bandwidth, and lower latency. An interconnect apparatus can comprise a plurality of logic units and a plurality of buses coupling the plurality of logic units in a selected configuration of logic units arranged in triplets comprising logic units LA, LC, and LD. The logic units LA and LC are positioned to send data to the logic unit LD. The logic unit LC has priority over the logic unit LA to send data to the logic unit LD. For a packet PKT divided into subpackets, a subpacket of the packet PKT at the logic unit LA, and the packet specifying a target either: (A) the logic unit LC sends a subpacket of the packet PKT to the logic unit LD and the logic unit LA does not send a subpacket of the packet PKT to the logic unit LD; (B) the logic unit LC does not send a subpacket of data to the logic unit LD and the logic unit LA sends a subpacket of the packet PKT to the logic unit LD; or (C) the logic unit LC does not send a subpacket of data to the logic unit LD and the logic unit LA does not send a subpacket of the packet PKT to the logic unit LD.

26 Claims, 14 Drawing Sheets

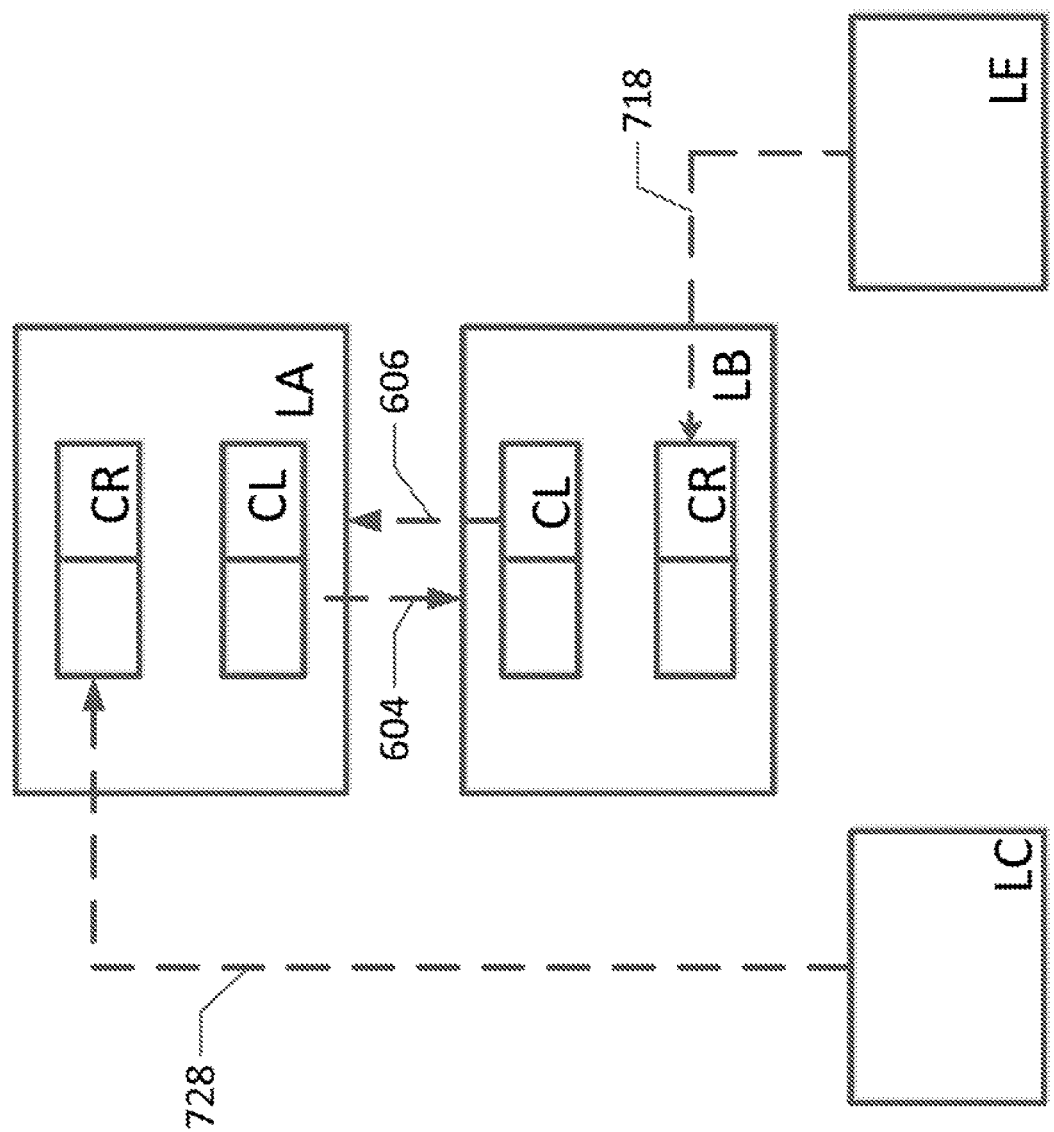

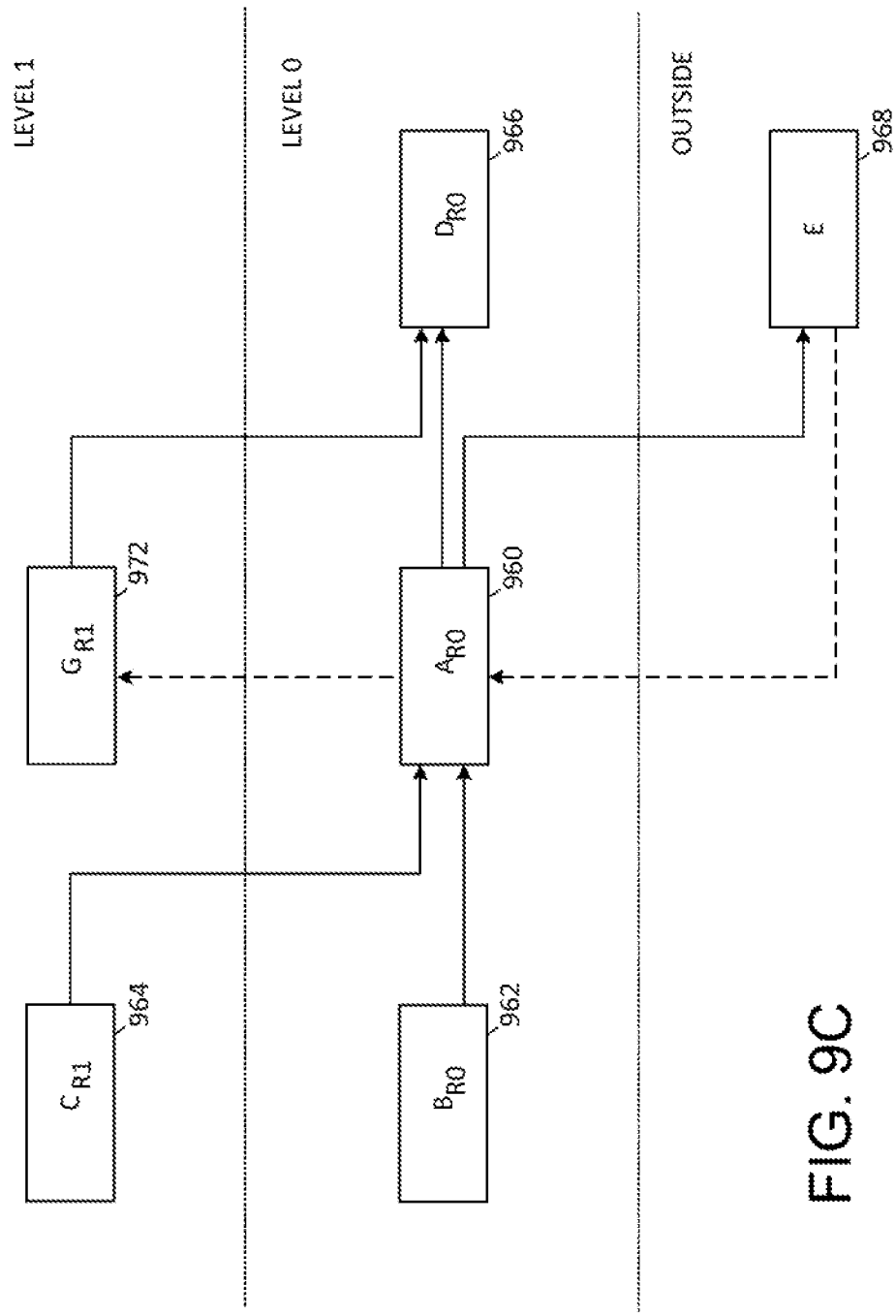

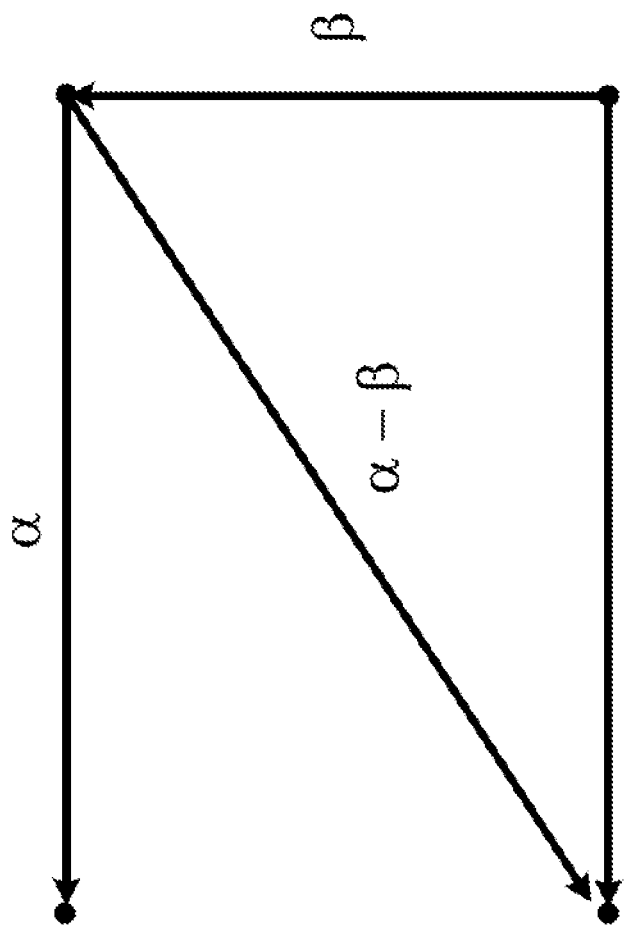

PARALLEL DATA SWITCH

CROSS-REFERENCE TO RELATED PATENTS

This application is a continuation of U.S. patent application Ser. No. 14/446,958, filed Jul. 30, 2014, which is a continuation-in-part of U.S. patent application Ser. No. 13/072,612, filed Mar. 25, 2011 (issued as U.S. Pat. No. 9,479,458 on Oct. 25, 2016); the disclosures of each of which are incorporated herein by reference in their entireties.

The disclosed system and operating method are related to subject matter disclosed in the following patents which are incorporated by reference herein in their entirety: (1) U.S. Pat. No. 5,996,020 entitled, "A Multiple Level Minimum Logic Network", naming Coke S. Reed as inventor; (2) U.S. Pat. No. 6,289,021 entitled, "A Scalable Low Latency Switch for Usage in an Interconnect Structure", naming John Hesse as inventor; and (3) U.S. Pat. No. 6,754,207 entitled, "Multiple Path Wormhole Interconnect", naming John Hesse as inventor.

BACKGROUND

Components of large computing and communication systems can be configured with interconnect structures of switch chips connected by interconnect lines. Increasing the switch-chip port count decreases the number of chip-to-chip hops, resulting in lower latency and lower cost. What is needed in these systems is switch chips that have high port count and are also able to handle short packets.

SUMMARY

Embodiments of an interconnect apparatus enable improved signal integrity, even at high clock rates, increased bandwidth, and lower latency. An interconnect apparatus can comprise a plurality of logic units and a plurality of buses coupling the plurality of logic units in a selected configuration of logic units arranged in triplets comprising logic units LA, LC, and LD. The logic units LA and LC are positioned to send data to the logic unit LD. The logic unit LC has priority over the logic unit LA to send data to the logic unit LD. For a packet PKT divided into subpackets, a subpacket of the packet PKT at the logic unit LA, and the packet specifying a target either: (A) the logic unit LC sends a subpacket of the packet PKT to the logic unit LD and the logic unit LA does not send a subpacket of the packet PKT to the logic unit LD; (B) the logic unit LC does not send a subpacket of data to the logic unit LD and the logic unit LA sends a subpacket of the packet PKT to the logic unit LD; or (C) the logic unit LC does not send a subpacket of data to the logic unit LD and the logic unit LA does not send a subpacket of the packet PKT to the logic unit LD.

BRIEF DESCRIPTION OF THE DRAWINGS

Embodiments of the invention relating to both structure and method of operation may best be understood by referring to the following description and accompanying drawings:

FIG. 1 is a data structure diagram illustrating an embodiment of a format of a packet comprising a number of sub-packet flits;

FIG. 8 is a block diagram illustrating control registers used in the logic elements of the switching nodes of an embodiment of the system disclosed herein;

FIGS. 9A, 9B, and 9C are schematic block diagrams that illustrate interconnections of nodes on various levels of the interconnect structure;

FIG. 10 is a timing diagram which illustrates timing of message communication in the described interconnect structure.

DETAILED DESCRIPTION

Figure 2A:
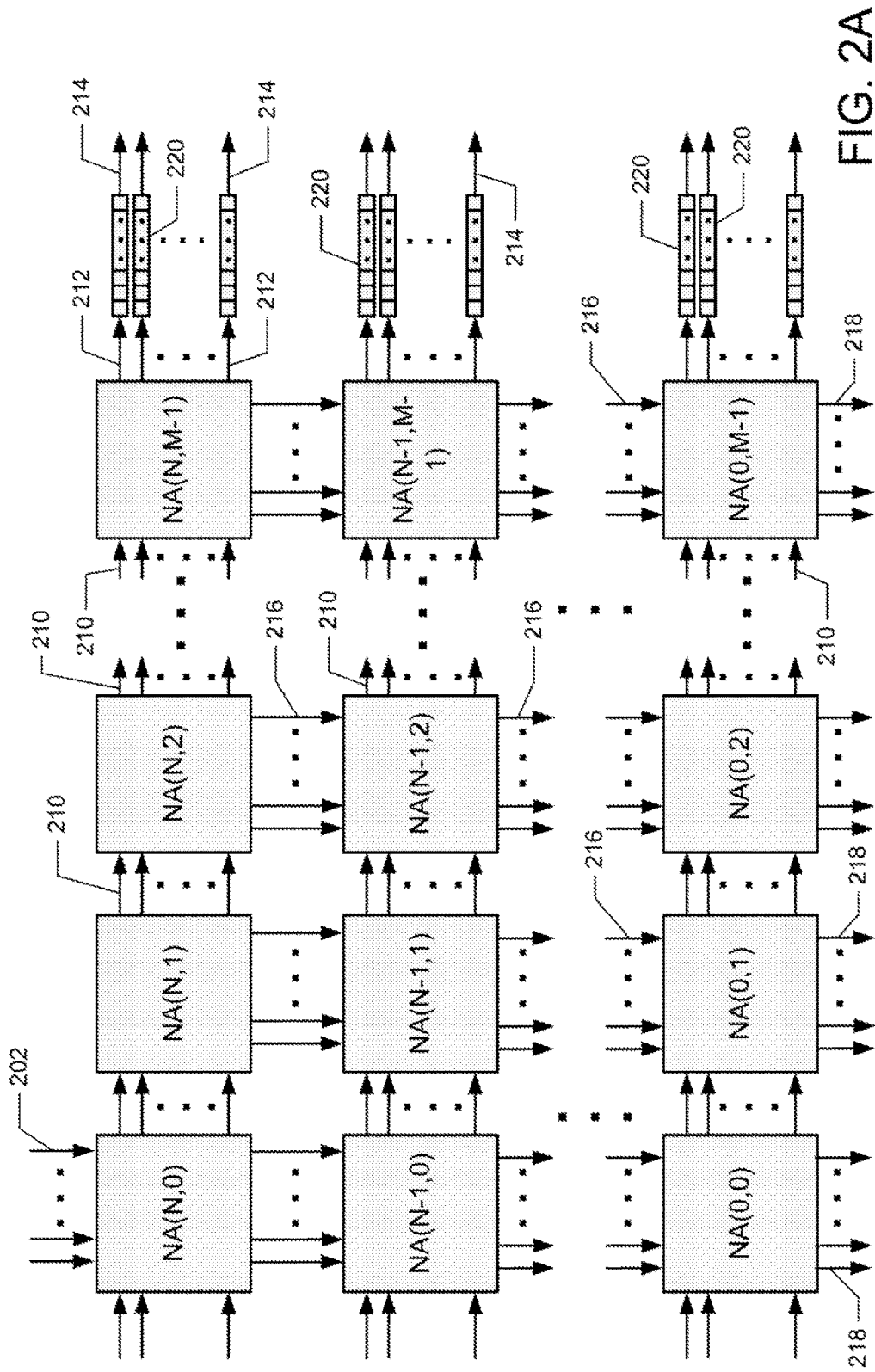
FIG. 2A is a schematic block diagram depicting a high-level view a switch described in an embodiment of referenced U.S. Pat. Nos. 6,289,021 and 6,754,207 including node arrays, connection lines, and FIFOs.

The devices, systems, and methods disclosed herein describe a network interconnect system that is extremely effective in connecting a large number of objects, for example line cards in a router, network interface cards in a parallel computer, or other communication systems and devices. The described network interconnect system has extremely high bandwidth as well as extremely low latency.

Computing and communication systems attain highest performance when configured with switch chips that have high port count and are also able to handle short packets. The Data Vortex® switch chips described in incorporated U.S. Pat. Nos. 5,996,020 and 6,289,021 have extremely high port counts and have the ability to transmit short message packets.

The systems and methods disclosed herein include several improvements over incorporated U.S. Pat. Nos. 6,289,021 and 6,754,207, attained by one or more of a number of enhancements, including the following two basic improvements: 1) the bandwidth is increased and the first-bit-in to last-bit-out latency is decreased by using parallel data lines between nodes; and 2) the bandwidth is further increased and the latency is further reduced by a logic that sets up a data path through the switch that contains a one-bit-long parallel FIFO at each level, enabling the use of a much faster clock than was possible in incorporated U.S. Pat. Nos. 6,289,021 and 6,754,207.

Incorporated U.S. Pat. No. 6,289,021 describes a switch that is suitable to be placed on a chip. In that system, data (in the form of packets) passes through the switch in wormhole fashion on one-bit wide data paths. The packets include a header and a payload. The first bit of the header is a status bit (set to a value of 1 in most embodiments) indicating the presence of a message. In a simple arrangement, the remaining header bits represent the binary address of a target output port. The topology of the switch includes a richly connected set of rings. A ($2^N \times 2^N$) switch includes rings arranged in (N+1) levels with connections between rings on different levels. Packets enter the switch at level N and exit the switch at level 0. The header of a message packet entering the switch on level N has one status bit and N target address bits. The logic at a node on level N makes routing decisions based on: 1) the status bit; 2) the first bit of the address in the header; 3) a control signal sent from a node on level N−1; and 4) (in the basic embodiment) a control signal from a node on level N. The first bit of the address in the header is used by the logic on level N. When the logic on a level N node directs a packet to a node on level N−1, the first bit of the address is discarded. This is done for several reasons; 1) The first address bit is not needed for routing decisions on lower levels; 2) the discarding of this bit allows the message packets on level N−1 to travel ahead of the packets on level N so that, based on incoming packets, level N−1 nodes can send control signals to level N nodes, thus enabling the level N−1 nodes to direct level N traffic: 3) the discarding of the first header bit ensures that the most significant bit of the remaining header bits is the bit that is needed to route the packet on level N−1. This process continues throughout the switch so that a packet on level K has one status bit followed by K address bits.

A consequence of this design is that data paths can be established that cut directly between levels. The timing of the system is such that two clock ticks are required for a status bit to move between two logic nodes on the same ring, but only one tick is required for the status bit to move between two nodes on different levels (a node on a level K ring is referred to as a level K node). Therefore, if the path of a packet through the switch contains N downward steps (steps between rings on different levels) and J steps between two nodes on a ring at a given level, then (N+2J+1) ticks are required before the first payload bit arrives at the output level 0. When the status bit is on level 0, there are 2J one-tick delays on different levels, with one data bit in each of the one-bit FIFO delay elements. The passing of information through multiple transistors on nodes at different levels necessarily limits the clock rate of the system. In fact, if a packet passes down at each step, the status bit arrives at level 0 while the first payload bit is on level N, the top entry level.

In contrast, for the system described herein, each bit of the packet passes through at least one single-tick FIFO on each level, advantageously enabling the signal to be reconstituted at each node and enabling the system described herein to operate at higher clock rates than systems described in incorporated U.S. Pat. No. 6,289,021.

The switching systems described in incorporated U.S. Pat. Nos. 5,996,020, 6,289,021, and 6,754,207 provide low latency with high bandwidth and also support short packets. The topology of the switches in incorporated U.S. Pat. Nos. 5,996,020, 6,289,021, and 6,754,207 includes a richly interconnected set of rings. FIG. 2A is a high-level block diagram of an embodiment of a switch described in incorporated U.S. Pat. Nos. 6,289,021 and 6,754,207. The entire structure illustrated in FIG. 2A fits on a single chip. The interconnection lines 210, 212, 214, 216 and 218 are bit serial. The specification that a packet fits on a single ring calls for inclusion of FIFO elements 220. To decrease the probability of a packet passing through FIFO 220, all of the packets are inserted into a single input node array through lines 202. The switch illustrated in FIG. 2A can be built using simple nodes illustrated in FIG. 3A or by using "double-down" or "flat latency" nodes illustrated in FIG. 3B.

Figure 3A:
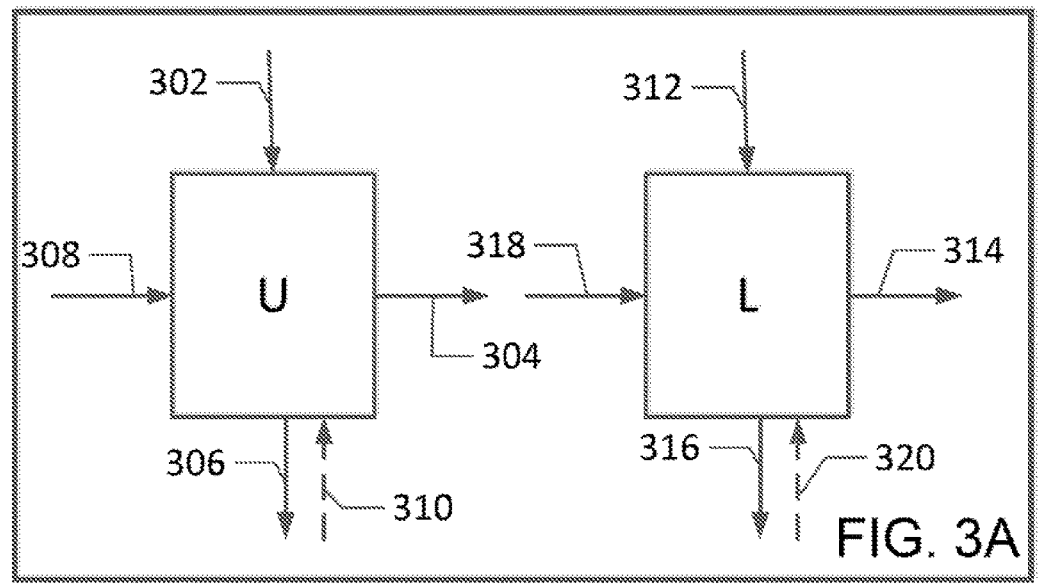
FIG. 3A is a schematic block diagram illustrating a pair of simple switch nodes as described in referenced U.S. Pat. Nos. 6,289,021 and 6,754,207.

First consider the simple switch U illustrated in FIG. 3A. One aspect of the operation of the switches of U.S. Pat. Nos. 6,289,021 and 6,754,207 is that the first bit of a data packet can enter the switch node U only at specific packet entry times. At a given packet entry time T, no more than one packet can enter the switch node U. This is the case because of the novel use of control lines described in the incorporated U.S. Pat. Nos. 5,996,020, 6,289,021, and 6,754,207.

For each switch node U of FIG. 3A on level N−K, there is a K long poly-bit $PB_U = (b_0, b_1, b_2, \ldots b_{K-1})$ such that each packet PK entering U has a target destination whose binary representation has leading bits ($b_0, b_1, b_2, \ldots b_{K-1}$). Each packet that exits switch node U through line 306 has a target destination whose binary representation has leading bits ($b_0, b_1, b_2, \ldots, b_{K-1}, 1$). Next consider the switch node L on level K such that each packet PK entering L has a poly-bit $PB_L = PB_U$ so that each packet PK entering L has a target destination whose binary representation has leading bits ($b_0, b_1, b_2, \ldots, b_{K-1}$). Each packet that exits switch node L through line 316 has a target destination whose binary representation has leading bits ($b_0, b_1, b_2, \ldots, b_{K-1}, 0$).

In case a packet PK enters U and the target address of PK has leading bits ($b_0, b_1, b_2, \ldots, b_{K-1}, 1$) and the control line 310 indicates a non-busy condition, then PK will exit U through line 306. Otherwise, PK must exit U through line 304. In case a packet PK enters L and the target address of PK has leading bits ($b_0, b_1, b_2, \ldots, b_{K-1}, 0$) and the control line 320 indicates a non-busy condition, then PK will exit L through line 316. Otherwise, PK must exit L through line 314.

Figure 3B:
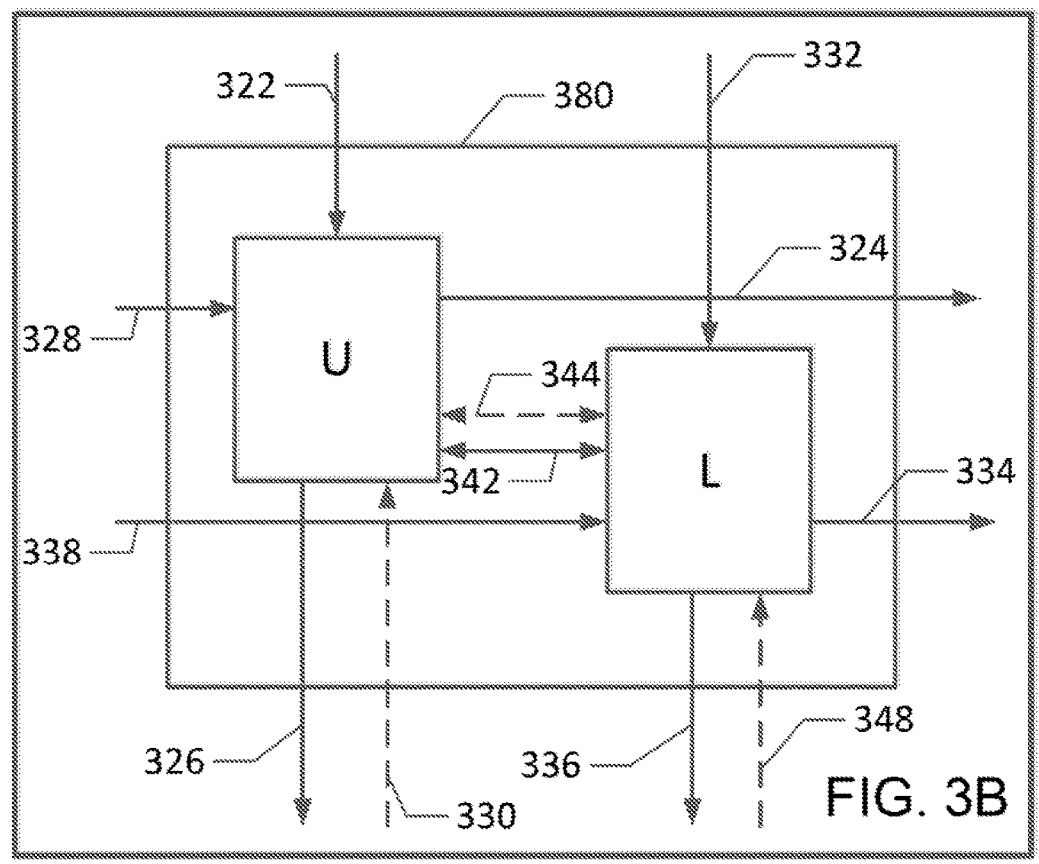
FIG. 3B is a schematic block diagram showing a connected pair of nodes as described in the "flat latency" or "double-down" version of the switches described in referenced U.S. Pat. Nos. 6,289,021 and 6,754,207.

The "double-down" switch 380 illustrated in FIG. 3B combines nodes U and L using additional logic and interconnection lines 342 and 344. The double-down switch DD 380 is positioned so that each packet that enters switch DD on level N−K has a destination whose target address has K leading bits $PB_{DD} = (b_0, b_1, b_2, \ldots, b_{K-1})$. Switch DD is positioned in the network so that each packet that exits node U of DD through line 326 has a target address with leading bits ($b_0, b_1, b_2, \ldots, b_{K-1}, 1$) and each packet that exits node L of DD through line 336 has a target address with leading bits ($b_0, b_1, b_2, \ldots, b_{K-1}, 0$).

The switch DD operates as follows when a packet PKT enters node U:

1) If a packet PKT enters node U of DD through line 328 and the leading address bits of the target of PKT are ($b_0, b_1, b_2, b_{K-1}, 1$), then a) if there is no busy signal on line 330, then the logic of U directs the packet PKT down line 326: or b) if there is a busy signal on line 330, then the logic of U directs the packet PKT through line 324 to another double-down switch in the network. In either case, the logic of U sends a busy signal on line 344 to node L to indicate that line 326 is busy.
2) If a packet PKT enters node U of DD through line 328 and the leading address bits of the target of PKT are ($b_0, b_1, b_2, \ldots, b_{K-1}, 0$), then a) if there is no busy signal on line 344, then the logic of U directs the packet PKT through line 342 to node L so that the logic of L can send PKT down line 336; or b) if there is a busy signal on line 344, then the logic of U directs the packet PKT through line 324 to another double-down switch in the network. The logic of U sends a busy signal on line 344 to node L to indicate that line 326 is busy only if there is a busy signal on line 330.

Packets entering node L behave similarly. Thus, when a packet PKT enters node L of the switch DD, the following set of events occur:

1) If a packet PKT enters node L of DD through line 338 and the leading address bits of the target of PKT are ($b_0$, $b_1$, $b_2$, ..., $b_{K-1}$, 0), then a) if there is no busy signal on line 348, then the logic of L directs the packet PKT down line 336; or b) if there is a busy signal on line 348, then the logic of L directs the packet PKT through line 334 to another double-down switch in the network. In either case, the logic of L sends a busy signal on line 344 to node U to indicate that line 336 is busy, 2) If a packet PKT enters node L of DD through line 338 and the leading address bits of the target of PKT are ($b_0$, $b_1$, $b_2$, ..., $b_{K-1}$, 1), then a) if there is no busy signal on line 344, then the logic of L directs the packet PKT through line 342 to node U so that the logic of U can send PKT down line 326; or b) if there is a busy signal on line 344, then the logic of L directs the packet PKT through line 334 to another double-down switch in the network. The logic of L sends a busy signal on line 344 to node U to indicate that line 336 is busy only if there is a busy signal on line 348.

The switching system described in the system disclosed herein represents important improvements over the switching system described in incorporated U.S. Pat. Nos. 6,289,021 and 6,754,207. The main improvements include: 1) the addition of parallel data paths through the system that enable higher bandwidths than were possible in the systems built in the incorporated U.S. Pat. Nos. 6,289,021 and 6,754,207; 2) a modified timing system that simultaneously enables the creation of data paths having FIFOs at each logic node with the advantages of said FIFOs including the ability to use high clock rates; 3) a timing system that employs only one tick for a packet flit to move between nodes on different levels and two ticks for a packet flit to move between nodes on the same level. Advantageously, the FIFO lines 214 of FIG. 2A are eliminated.

FIG. 1 illustrates the layout of a packet. The packet is decomposed into Q sub-packets referred to as flits. Each of the flits has R bits. The flits are designed to travel through an R wide bus. The first flit, $F_0$ 102, is the header flit. It consists of a status bit $H_0$, N routing bits $H_1$, $H_2$, ..., $H_N$, and additional bits (set to 0 in FIG. 1) that can be used to carry other information, e.g. error correction bits or QOS. The status bit $H_0$ is set to 1 to indicate the presence of a packet. The N routing bits represent the binary address of the target. Therefore, a switch with N routing bits, is used in a switch of radix $2^N$. A logic L on level K uses bit. $H_K$ in conjunction with control bits to route $F_0$.

Figure 2B:
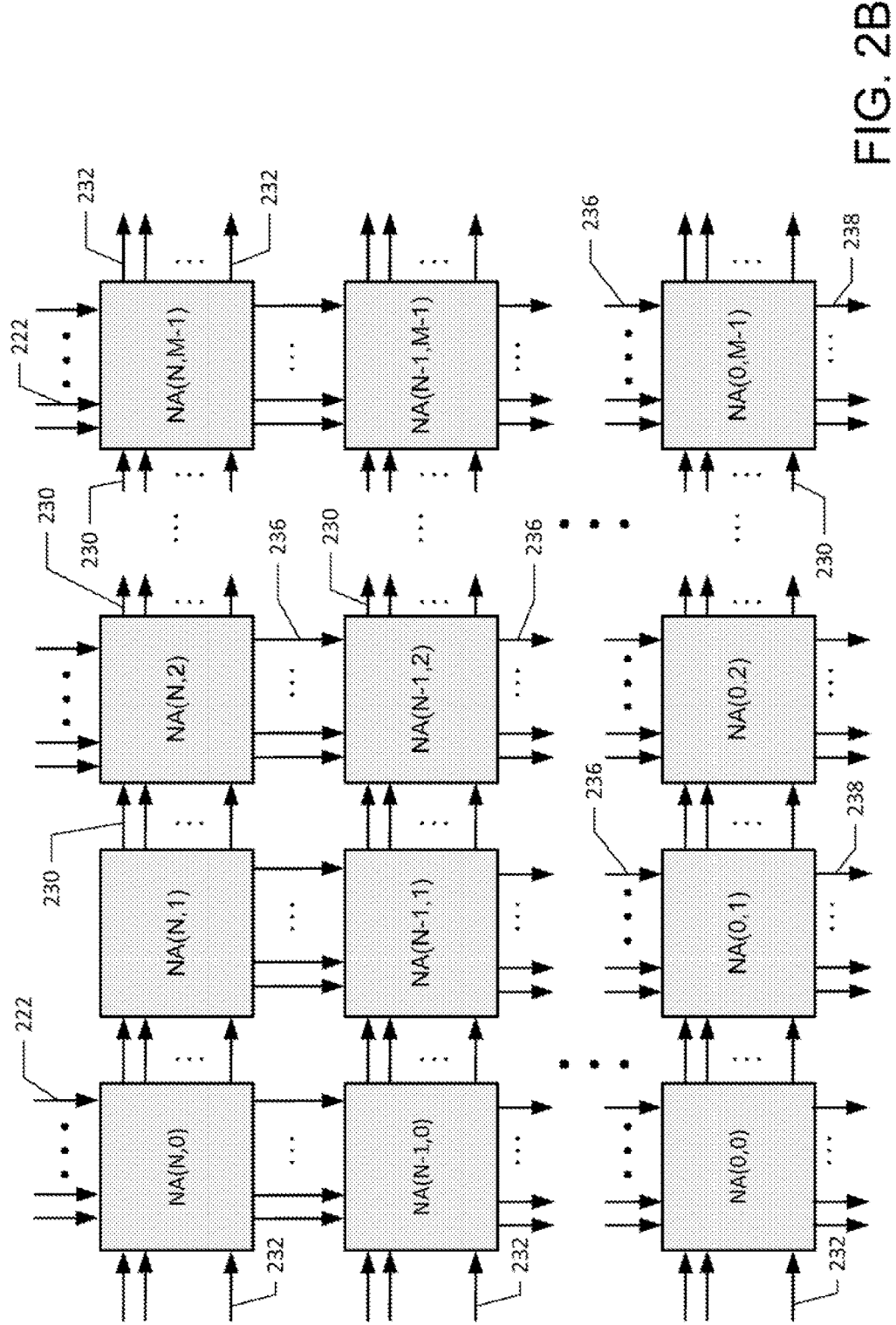
FIG. 2B is a schematic block diagram showing a high-level view of a switch in an embodiment of the system disclosed herein comprising node arrays interconnects.

FIG. 2A represents a high level block diagram of the switch presented in incorporated U.S. Pat. Nos. 6,289,021 and 6,754,207. FIG. 2B represents a high level block diagram of the switch of the present patent wherein all header bits can be used to route the packet through the switch. In referenced U.S. Pat. Nos. 6,289,021 and 6,754,207 and also in the present disclosure, the node arrays are arranged in rows and columns. The node array NA(U,V) in a radix $2^N$ switch includes $2^N$ switching nodes on level U in column V. In U.S. Pat. Nos. 6,289,021 and 6,754,207 and also in the present system, in an example embodiment, a switch of radix $2^N$ has (N+1) rows (or levels) of node arrays from an entry level N to an exit level 0. The switch has some number M of columns (where the number of columns is a design parameter). There are important novel improvements in the system introduced in the disclosed system. In the disclosed system, the lines between the node arrays include busses that replace the single-bit-wide lines used in patents no. 2 and no. 3. The nodes in the node array have novel new designs that enable lower latencies and higher bandwidths. Additionally, in incorporated U.S. Pat. Nos. 6,289,021 and 6,754,207, the system includes a FIFO shift register 220 of sufficient length so that an entire packet can fit on a given ring on level 0; two packets can fit on a ring on level 1, and in general $2^R$ packets can fit on a ring on level R. This FIFO can be eliminated in switches using the technology of the present disclosure because the width of the parallel bus will make it possible to have a sufficient number of active nodes, thus enabling entire messages to fit in the active elements of a row of nodes. Referring to FIG. 2B, each data carrying line can include a bus with a width that is equal to the length of an R-long sub-packet as illustrated in FIG. 1. The R long sub-packet can be referred to as a flit. The busses connect nodes in which each node is a module containing a one-tick logic element followed by a one tick delay element followed by a multiplexer (an LDM module). Two flits fit in an LDM module. Therefore, a packet containing Q flits can fit in Q/2 LDM modules on a single row of node arrays in FIG. 2B. In one illustrative embodiment, the top level (level N) contains LDM modules on a single ring. The LDM modules on level N-1 are arranged on two rings. The bottom node array includes $2^N$ rings with each ring including M nodes connected by an R-wide bus. The arrangement of the nodes and busses in the node arrays make the ring structure possible. Each ring on level 0 must be long enough to hold an entire packet consisting of Q flits. Each ring on level 0 delivers packets to a single target address. A plurality of output ports 238 can connect from a single level 0 ring. Each of these outputs from a single ring delivers data to the same target output. Data is input into the structure through input busses 222. In the simple embodiment, as shown, each logic node on a given level W is connected to forward packets to the next logic node on the associated ring and also is positioned to forward packets to one of two logic nodes on level W-1. In the present configuration (as depicted in U.S. Pat. Nos. 6,289,021 and 6,754,297) a logical element on level W-1 has priority over a logic node on level W to forward data to a logic element on level W-1. In the illustrative example presented herein, each level contains the same number of logic nodes.

In embodiments of incorporated U.S. Pat. Nos. 6,289,021 and 6,754,207, ail of the packets enter node array NA(N,0) (where N denotes the level of the array and 0 denotes the entry angle of the node array) in order to minimize the probability of a given packet entering FIFO 220. The elimination of the FIFO 220 enables the embodiments of the present disclosure to provide for the insertion of packets at a plurality of angles. The plurality of insertion angles reduces the number of packets inserted at any given angle, thereby reducing congestion. In the present invention, the first flit $F_0$ of a packet can enter a node only at specified entry times that are different for different nodes in the system.

An embodiment of the presently-disclosed switch has connections that correspond to the connections illustrated in FIG. 3B. Therefore, the wiring pattern topology for the disclosed system, as illustrated in FIG. 2B, can be the same as the wiring pattern topology illustrated in FIG. 2A and described in incorporated U.S. Pat. Nos. 5,996,020, 6,289,021, and 6,754,207.

Figure 4:
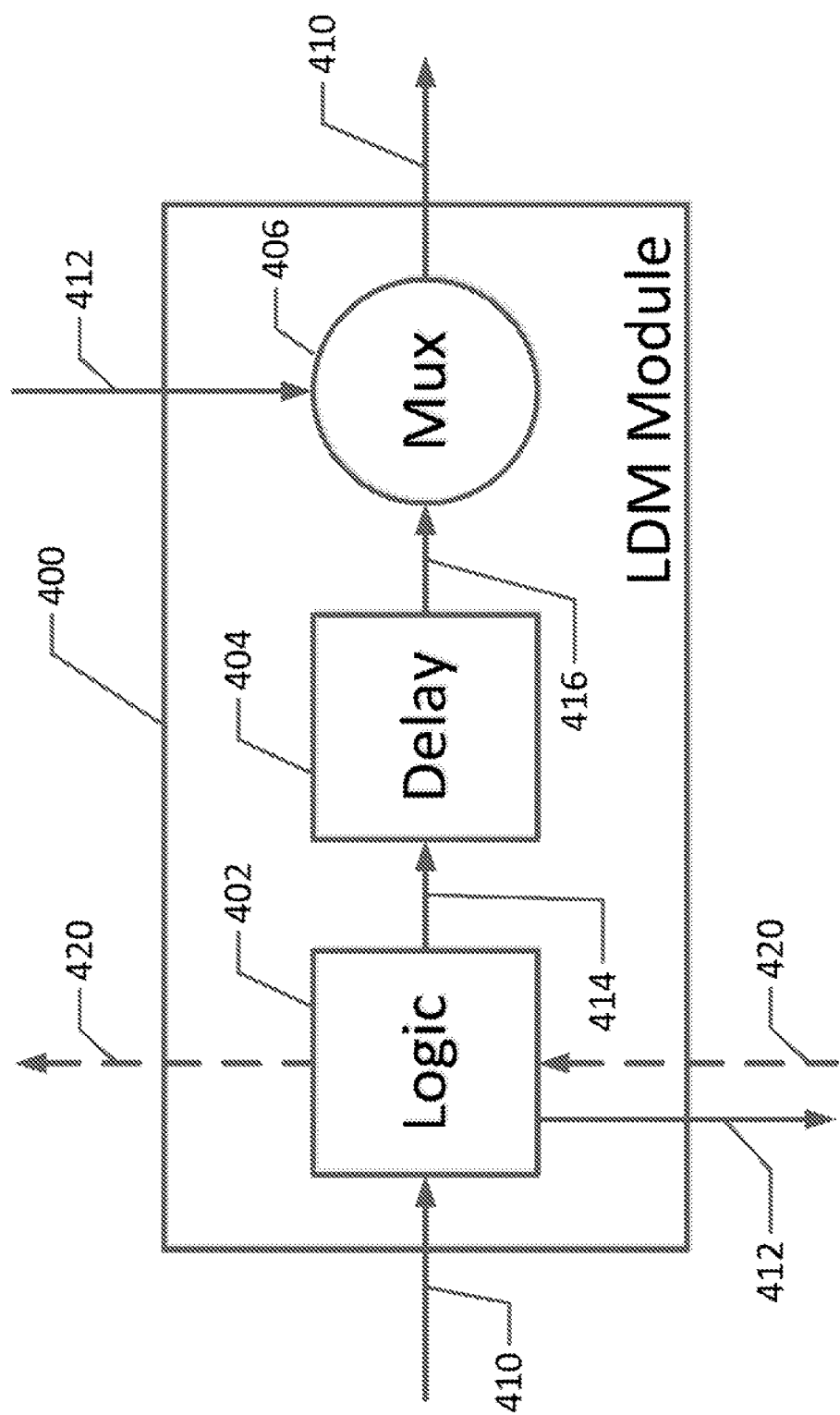
FIG. 4 is a schematic block diagram depicting a building block for a node in an embodiment of the disclosed system (referred to herein as an LDM module) including a one-tick delay logic element, a one-tick delay FIFO element, and a multiplexing device for combining busses.

Referring to FIG. 4, a block diagram of an individual switching module 400 is shown including a logic element 402, a delay element 404 and a multiplexing element 406.

The module with logic, delay and multiplexer (mux) is referred to as an LDM module. The LDM modules are components used in the construction of the switching nodes in the node arrays illustrated in FIG. 2B. Timing of the packet entry into a logic element 402 is important for correct operation of the high-speed parallel switch of the disclosed system. Each logic device 402 is capable of holding exactly one flit of a packet. Moreover, each delay device 404 is also capable of holding exactly one packet flit. At the conclusion of a time step, the logic device 402 may or may not contain one flit of a packet. Similarly, at the conclusion of a time step, the delay device 404 also may or may not contain one flit of a packet. In case the delay device contains one flit $F_L$ of a packet P and $F_L$ is not the last flit of the packet (i.e., L<Q), then the logic device contains flit $F_{L+1}$ of the packet. If L≠0 and $F_L$ is in a logic unit or delay unit, then the location of flit $F_L$ at time $T_S$ is equal to the location of flit $F_{(L-1)}$ at time $T_{S-1}$. In this manner, packets travel in wormhole fashion through the switch.

In the illustrative embodiment, an LDM module comprises logic, delay, and multiplexer devices configured to synchronize timing of a packet.

Figure 5:
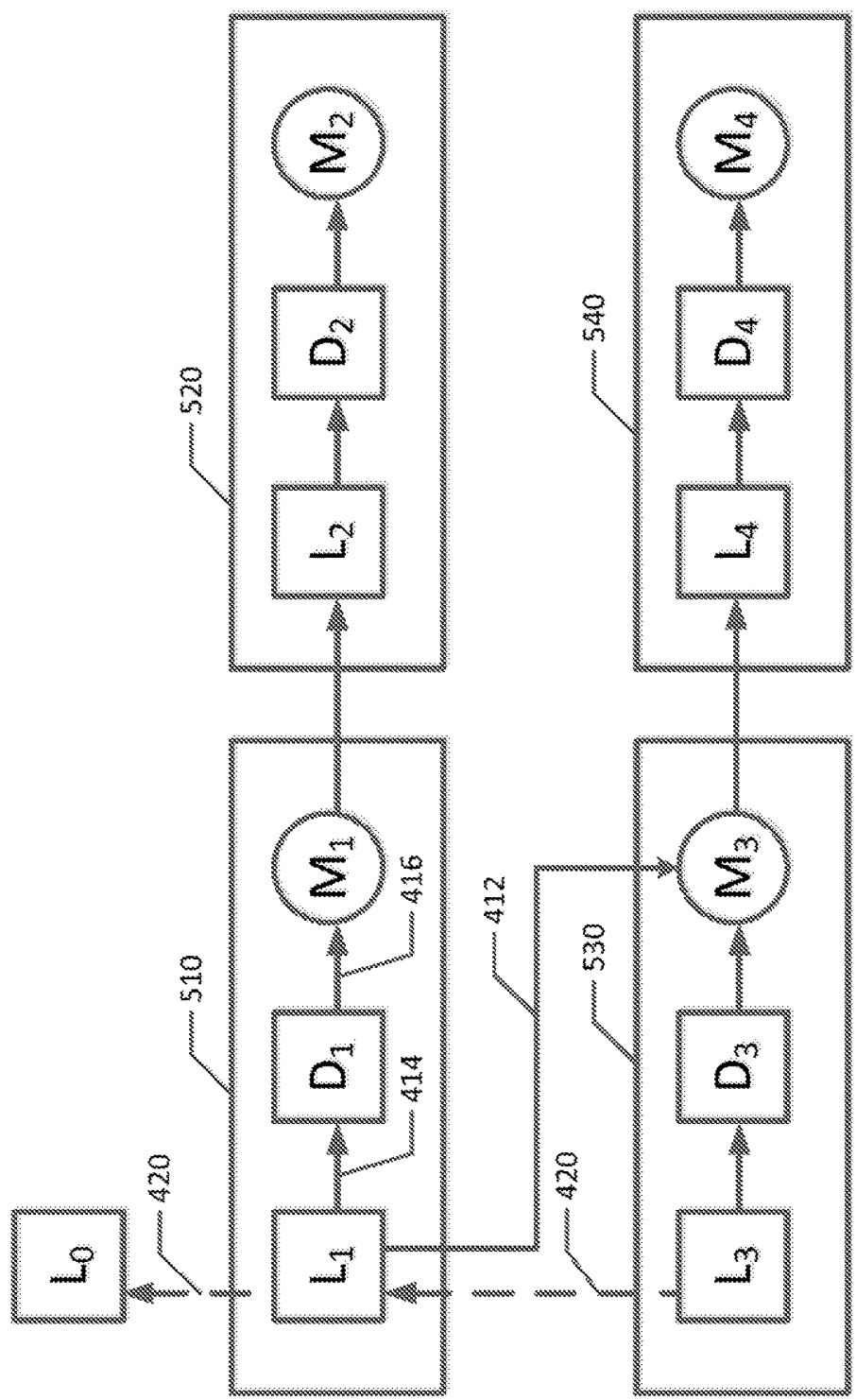
FIG. 5 is a block diagram showing four interconnected LDM modules in accordance with an embodiment of the disclosed system.

Referring to FIG. 5 in conjunction with FIG. 4, basic operations and timing of the LDM modules are described. The LDM module with logic element $L_1$ is in the node array NA(W,Z); logic element $L_2$ is in NA(W, Z+1): $L_3$ is in NA(W−1, Z): and logic element $L_4$ is in NA(W−1,Z+1).

At each packet insertion time for $L_1$, the logic unit L, checks for a flit arrival by checking for a status bit $H_0$ set to 1. In case, at a flit arrival time $T_S$ for logic unit $L_1$, the logic senses that $H_0$, is set to 0, the logic unit identifies that no packet is arriving in this time slot and takes no action until the next first flit packet arrival time. If at a first flit arrival time $T_S$ for $L_1$ (as identified by a clock or counter) the logic unit senses a 1 in the status bit slot $H_0$ in $F_0$, the logic unit ascertains that it contains the first flit of a valid packet PKT and precedes as follows:

(A) if 1) based on the bit $H_W$ of $F_0$, $L_1$ determines if a path exists from $L_4$ to a target output of PKT, and 2) the control signal from $L_3$ indicates that $L_1$ is free to use line 412, then $L_1$ sends the first flit $F_0$ of PKT through $M_3$ to arrive at $L_4$ at time $T_{S+1}$.

(B) If one or both of the above conditions 1) and 2) is not met, then $L_1$ sends the first flit $F_0$ of PKT to $D_1$ in order to arrive at $D_1$ at time $T_{S+1}$ and subsequently to arrive at $L_2$ at time $T_{S+2}$ (one unit of time after first flits arrive at $L_4$).

Figure 6:
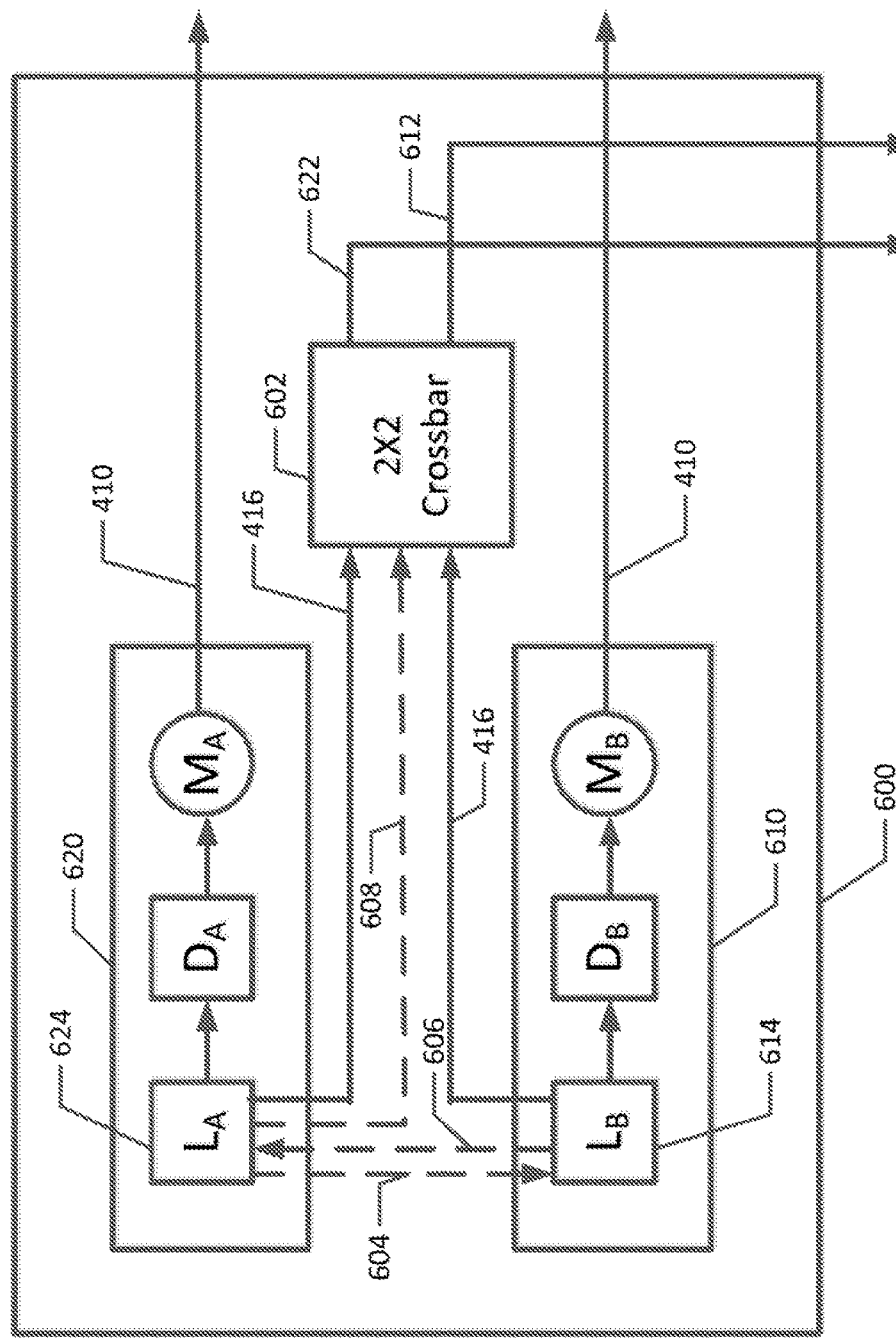
FIG. 6 is a block diagram illustrating a switching node used in an embodiment of the disclosed system.
Figure 7:
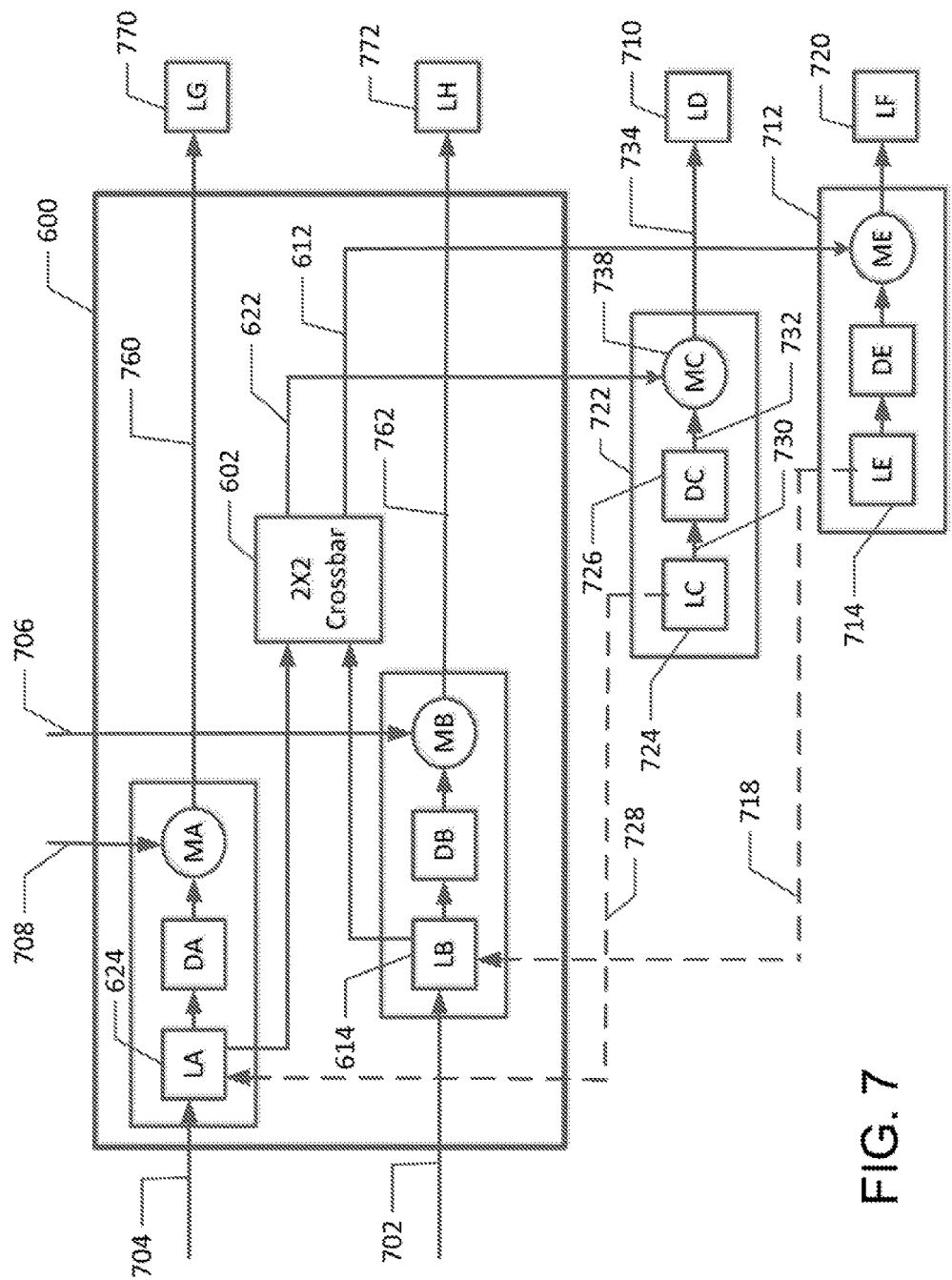
FIG. 7 is a block diagram showing the source and timing of the control signals sent to the logic elements in an embodiment of the switching node of the disclosed system.

A detailed discussion of the use of the routing bit $H_W$ and the control signals is included in the discussions of FIGS. 6, 7, and 8. Timing of first flit arrival at logic units on different levels in the same column is important for the proper operation of the switching system. Since first flits arrive at logic elements in NA(W−1,Z+1) one time unit before first flits arrive at logic elements in NA(W,Z+1), sufficient time is available for control signals generated on level W−1 to control the routing of packets on level W.

Given that an initial flit $F_0$ of a packet PKT arrives at a logic unit L in time step $T_S$, then the next flit $F_1$ of PKT will arrive at L in time step $T_{S+1}$. This continues until the last flit $F_{Q-1}$ of PKT arrives at the logic unit L at time $T_{S+Q-1}$. Similarly, given the arrival of an initial flit $F_0$ of a packet PKT arrives at a delay unit D in time step $T_S+_1$, then the next flit $F_1$ of PKT will arrive at D in time step $T_{S+2}$. This continues until the last flit $F_{Q-1}$ of PKT arrives at D at time $T_{S+Q}$. Each time that a flit of a packet arrives at a logic or delay unit, the signal of the flit is regenerated. This signal regeneration at each tick allows for higher chip clock rates.

In a simple "single-down" embodiment, an LDM module can be used as a node in the switch.

Referring to FIG. 6 a switching node used in the switch of an embodiment of disclosed system is shown. The switching node contains two LDM modules 610 and 620 and a 2×2 crossbar 602. Suppose the switching node represented in FIG. 6 is in node array NA(W,Z). The LDM modules are of two types: 1) a type α LDM module 620 that is able to control the crossbar 602 by sending a signal down line 608 and 2) a type β module 610 that is not able to control the crossbar 602. Suppose the interesting case where the level W is not equal to either 0 or N. The set of packet entry times for the type α module 620 is equal to the set of packet entry times for the type β module 610.

Referring to FIG. 7, a schematic block diagram illustrates an embodiment of an interconnect apparatus which enables improved signal integrity, even at high clock rates, increased bandwidth, and lower latency. The illustrative interconnect apparatus comprises a plurality of logic units and a plurality of buses coupling the plurality of logic units in a selected configuration of logic units which can be considered to be arranged in triplets comprising logic units LA 624, LC 724, and LD 710. The logic units LA 624 and LC 724 are positioned to send data to the logic unit LD 710. The logic unit LC 724 has priority over the logic unit LA 624 to send data to the logic unit LD 710. For a packet. PKT divided into subpackets, a subpacket of the packet PKT at the logic unit LA 624, and the packet specifying a target either: (A) the logic unit LC 724 sends a subpacket of the packet PKT to the logic unit LD 710 and the logic unit LA 624 does not send a subpacket of the packet PKT to the logic unit. LD 710: (B) the logic unit LC 724 does not send a subpacket of data to the logic unit LD 710 and the logic unit LA 624 sends a subpacket of the packet PKT to the logic unit LD 710; or (C) the logic unit LC 724 does not send a subpacket of data to the logic unit. LD 710 and the logic unit LA 624 does not send a subpacket of the packet PKT to the logic unit LD 710.

In the illustrative interconnect structure, the logic, delay, and multiplexer units can be configured with insufficient memory to hold the entire packet, and thus have only a bus-wide first-in-first-out (FIFO) buffer. Thus, packets are communicated on a bus wide data path.

A logic node does not reassemble a packet. A first subpacket, called a flit, of a packet PKT arrives at a logic node LA at a given time $T_1$. At time $T_2$, the first flit of PKT arrives at the next downstream logic unit or delay unit. Also at time $T_2$, the second flit of PKT arrives at logic unit LA 624. In fact, the packet is never reassembled in the switch it leaves the switch one flit at a time. As a detail, a flit formed of R bits (See FIG. 1) travels through the switch in wormhole fashion and exits through a SER-DES (serializer-deserializer) module connected to a sequential interconnect that runs R times as fast.

Logic unit LA 624 will send PKT to logic unit LD 710 provided that 1) a path exists from logic unit LD 710 to the target output port for PKT; and 2) logic unit LA 624 is not blocked from traveling to logic unit LD 710 by a logic element LC with a higher priority than logic unit LA 624 to send to logic unit LD 710. Referring to FIG. 7, only logic unit LC 724 has a higher priority than logic unit LA 624 to send to logic unit LD 710 whereas both logic units LB and LE have a higher priority than logic unit LA 624 to send to logic unit LF. In the example, a flit of PKT is at logic unit LA 624. Logic unit LA 624 routes the first flit of PKT based on header information and incoming control bits. Logic unit LA 624 sends the second flit of PKT to the same element that it sent the first flit. In any case, logic unit LA 624 cannot hold onto a packet, if a flit arrives at time $T_1$ it is forwarded at time $T_2$.

The interconnect structure transfers the packets and subpackets in a sequence of time step. With a sequence of flits of the packet PKT entering the logic unit LA 624 at the operating time at an instant. Accordingly, the data communication operation can be considered to operate at instances in time.

In the illustrative embodiment, a first flit, or subpacket, of the packet PKT contains routing information through a switch to the target.

The logic unit LC 724 uses a control signal sent to the logic unit. LA 624 to enforce priority over the logic unit LA 624 to send packets to logic unit LD 710.

A logic unit routes a packet based on packet header information and also based on control signals from other logic units.

The interconnect structure can further comprise a one-tick first-in-first-out (FIFO) buffer. A flit (subpacket) entering a logic unit passes through the one tick FIFO at the logic unit, regenerating the signal at each logic unit.

In some embodiments, the interconnect structure can operate so that, for the logic unit LA 624 positioned to send packets to a plurality of logic units including the logic unit LD 710, either Case 1 or Case 2 hold. In Case 1, the logic unit LA 624 determines that LD is the logic unit that is most appropriate to receive packet PKT, and either the logic unit LC 724 sends a packet to logic unit LD 710 and the logic unit LA 624 sends the PKT to a logic unit LG distinct from LD; or no logic unit with higher priority than the logic unit LA 624 to send packets to the logic unit LD 710 sends a packet to the logic unit LD 710 and the logic unit LA 624 sends the packet PKT to the logic unit LD 710. In Case 2, the logic unit. LA 624 determines that sending the packet PKT to the logic unit LD 710 is unacceptable, and the logic unit LA 624 sends the packet PKT in the logic unit LG distinct from the logic unit LD 710 or to the logic unit LF 720 distinct from the logic unit LD 710.

For the logic unit LA 624 receiving a first subpacket of the packet PKT at a time $T_S$, if the logic unit LA 624 sends the first subpacket of the packet. PKT to the logic unit LD 710, then logic unit LD 710 receives the first subpacket of packet PKT at a time $T_{S+1}$. If the logic unit LA 624 sends the first subpacket of the packet PKT to the logic unit LG, then the first subpacket passes through a delay unit DA and arrives at the logic unit LG at a time $T_{S+2}$. If the logic unit LC 724 sends a first subpacket of a packet QKT to the logic unit LD 710 and the first subpacket of a packet QKT blocks packet PKT from traveling to the logic unit LD 710, then the subpacket QKT arrives at the logic unit LD 710 at time $T_{S+1}$.

In some embodiments, if the logic unit LA 624 determines that the logic unit LD 710 is a most appropriate logic unit to receive the packet PKT, then the logic unit LD 710 reaches that determination based on the routing information in the packet PKT. If the logic unit LA 624 determines that sending the packet PKT to the logic unit LD 710 is not acceptable, then the logic unit LD 710 reaches the determination based on the routing information in the packet. PKT.

Referring to FIG. 7 in conjunction with FIGS. 6 and 3B, data and control lines that govern the high-speed parallel data path switching node 600 are described. Packets arrive at logical element LA on line 704 from another logic element on level W or on level W+1. At a given packet entry time $T_S$ for logical element. LA, exactly one of the following conditions is satisfied:

1) no first flit $F_0$ arrives at logic unit LA;
2) exactly one first flit arrives at logic unit LA from a logic element on level W, but no first flit $F_0$ arrives at logic unit LA from a logic element on level W+1; and
3) exactly one first flit arrives at logic unit LA from a node on level W+1, but no first flit $F_0$ arrives at logic unit LA from a node on level W.

Similarly, packets arrive at logic element LB from a logic element on level W+1 or from a logic element on level W. At logic node LB packet entry time $T_S$, either no first flit arrives at logic element LB or exactly one first flit arrives at logic element LB. Importantly, given that a first flit $F_0$ of a packet PKT arrives at a logic element $L_A$ at time $T_S$, the next flit $F_1$ of PKT arrives at $L_A$ at time $T_{S+1}$, followed by the other flits of PKT so that the last flit $F_{Q-1}$ of PKT arrives at $L_A$ at time $T_{S+Q-1}$. Similarly, given that flit $F_C$ (with C<Q) of PKT is in delay element DEL at time $T_D$ then flit $F_{C+1}$ of PKT is in delay element DEL at time $T_{D+1}$. Thus at each logical element and each delay element, the signal is reconstructed. This feature of the presently disclosed system, which is not shown in U.S. Pat. Nos. 6,289,021 and 6,754,207, enables the switch chip clock to run faster than the clock in the systems depicted in U.S. Pat. Nos. 6,289,021 and 6,754,207.

With continued reference to FIG. 7 in conjunction with FIG. 6, the node 600 is on level W of the N+1 level switch. Define Δ to be N−W. Corresponding to the node 600, a Δ long binary sequence BS ($b_0, b_1, \ldots, b_{\Delta-1}$) exists such that each packet entering logic unit LA or logic unit LB of node 600 has a target address whose leading bits are BS. Each time that a packet PKT moves down a level in the switch, an additional bit of the target address of PKT is set. Each packet entering logic element LD has a target whose binary address has leading bits ($b_0, b_1, \ldots, b_{\Delta-1}, 1$). Each packet entering logic element LF has a target whose binary address has leading bits ($b_0, b_1, \ldots, b_{\Delta-1}, 0$). The bus 622 connects LA and LB to a logic element LD 710 in a node on level W−1 so that a packet P with first flit $F_0$ in logic unit LA or logic unit LB is able to progress to its target output through LD provided that the bit $H_W$ of $F_0$ is equal to 1 and other control line conditions (discussed below) are satisfied. The bus 612 connects logic unit LA and logic unit LB to a logic element LF 720 in a node on level W−1 so that a packet PKT with first flit $F_0$ in logic unit LA or logic unit. LB is able to progress to its target output through logic element LF provided that the bit $H_W$ of $F_0$ is equal to 0 and other control line conditions (discussed below) are satisfied.

A logic element LC 724 exists in a LDM module 722 on level W−1 such that the logic element LC is positioned to send data to logic element. LD 710 through delay unit DC. Also, a logic element LE 714 exists on level W−1 such that the logic element LE 714 is able to send data to LF 720 through delay unit DE. Suppose that $T_S$ is a packet arrival time for logic elements LA 624 and LB 614. Then $T_{S+1}$ is a packet arrival time at logic unit LF. A packet PKT traveling from logic element. LE to LF must have its first flit $F_0$ in DE at time $T_S$ and therefore must have its first flit in LE at time $T_{S-1}$. Similarly, a packet PKT traveling from LC to LD must have its first flit arrive in LC at time $T_{S-1}$. Therefore, $T_{S-1}$ is a packet arrival time for both logic elements LC and LE.

The lack of static buffers in the switch can be compensated for a priority scheme for competing messages to travel to logic element LD or LF. The priority scheme gives highest priority to level W−1 packets and gives the bar setting (where the packet travels horizontally on the same path) of crossbar 602 priority over the cross setting (where the packet travels diagonally to an alternate path) of that switch.

Therefore, the priority scheme for the first flits $F_0$ of packets entering LD 710 at time $T_{S+1}$ is as follows:
1) A packet whose first flit $F_0$ is in DC at time $T_S$ has priority one to travel to logic unit LD and such a packet will always arrive at logic unit LD at time $T_{S+1}$;
2) A packet whose first flit $F_0$ is in logic unit LA 624 at time $T_S$ and whose $F_0$ bit $H_W$ is 1 has priority two and will travel through switch 602 set to the bar state to arrive at logic unit LD at time $T_{S+1}$, provided there is no priority one packet arriving at logic unit LD at time $T_{S+1}$; and
3) A packet whose first flit $F_0$ is in logic unit LB 614 at time $T_S$ and whose $F_0$ bit $H_W$ is 1 has priority three and will travel through switch 602 set to the cross state to arrive at logic unit LD at time $T_{S+1}$, provided that no priority one or priority two packet will arrive at logic unit LD at time $T_{S+1}$.

The priority scheme guarantees that lines 732 and 622 cannot possibly carry information at the same time. Therefore, the signals from those two lines can be joined in the multiplexer MC with no loss of fidelity. Notice that it is not necessary to designate a tick for multiplexer MC. A similar situation exists for multiplexer ME.

Similarly, the priority scheme for the first flits $F_0$ of packets entering LF 720 at time $T_{S+1}$ is as follows:
1) A packet whose first flit $F_0$ is in delay DE at time $T_S$ has priority one to travel to logic LF and such a packet will always arrive at logic LF at time $T_{S+1}$;
2) A packet whose first flit $F_0$ is in logic LB 614 at time $T_S$ and whose $F_0$ bit $H_W$ is 0 has priority two and will travel through switch 602 set to the bar state to arrive at logic LF at time $T_{S+1}$, provided there is no priority one packet arriving at logic LF at time $T_{S+1}$; and
3) A packet whose first flit $F_0$ is in logic LA 624 at time $T_S$ and whose $F_0$ bit $H_W$ of $F_0$ is 0 has priority three and will travel through switch 602 set to the cross state to arrive at logic LF at time $T_{S+1}$, provided that no priority one or two packet will arrive at LF at time $T_{S+1}$.

Refer to FIG. 6 in conjunction with FIG. 7 and FIG. 8. The integer W denotes the integer such that, in FIG. 7, the logical elements LA, LB, LG, and LH are on level W of the switch and the logical elements LC. LD, LE, and LF are on level W−1 of the switch. The priority scheme is enforced by logic unit control registers CR and CL which are set by control packets from logic or delay units in the LDM modules. Each of the logic elements in the parallel double-down switch contains two control registers CR (remote control) and CL (local control) and each control register contains two bits, thus allowing each register to store the binary representation of any one of the integers 0, 1, 2, or 3. $T_S$ is packet time arrival at the logical elements LA and LB: $T_{S+1}$ is an arrival time at LD, and LF; is an arrival time at LG and LH. $T_S$ is an arrival time at DC and DE and $T_{S-1}$ is an arrival time at LC and LE. Prior to time $T_{S-1}$, the registers $C_R$ and $C_L$ in LA and LB are set to 0. The register CR in LA is set to a value distinct from 0 by a control signal on line 728 from LC. The register CR in LB is set to a value distinct from 0 by a control signal on line 718 from LE. The register CL in LB is set to a value distinct from 0 by a control signal on line 604 from LA. The register CL in LA is set to a value distinct from 0 by a control signal on line 606 from LB. The LDM module 620 is able to set the crossbar switch 602 to the bar or cross state by sending a signal from LA down line 608. The crossbar controlling LDM module 620 is referred to as the type α LDM module. The LDM module 610 has no means to control the crossbar 602 and is referred to as the type β LDM module. The crossbar has three states: state 0 indicates that the crossbar is not ready to receive data; state 1 indicates that the crossbar is in the bar state and is ready to receive data: state 2 indicates that the crossbar is in the cross state and is ready to receive data. If a packet flit arrives at the crossbar while the crossbar is in state 0, the flit will be stored in a flit wide buffer until the crossbar state is set to 1 or 2. There is a logic that keeps track when the last flit of a packet exits the crossbar. The state of the crossbar remains constant while flits of a given packet are passing through it. When the last flit exits the crossbar, the crossbar is placed in state 0.

In an illustrative embodiment, functionality of the control registers in logical element LA can be defined as follows:
1) CR=1 implies logical element LD is blocked by a packet from logical element LC;
2) CR=2 implies logical element LD is not blocked and can receive a packet from logical element LA;
3) CL=1 implies logical element LB is sending a packet to logical element LF though the crossbar in the bar state;
4) CL=2 implies logical element LF is not blocked and can receive a packet from logical element LA: and
5) CL=3 implies logical element LF is blocked by a packet from logical element. LE.

In an illustrative embodiment, functionality of the control registers in logical element LB can be defined as follows:
1) CR=1 implies logical element LF is blocked by a packet from logical element LE;
2) CR=2 implies logical element LF is not blocked and can receive a packet from logical element LB;
3) CL=1 implies logical element LA is sending a packet to logical element LD through the crossbar in the bar state;
4) CL=2 implies logical element LD is not blocked and can receive a packet from logical element LB; and
5) CL=3 implies logical element LD is blocked by a packet from logical element LC.

The switch illustrated in FIG. 6, FIG. 7, and FIG. 8 can operate as follows:

In a first action, at or before packet arrival time $T_S$, the CR registers are set by a signal on line 728 from logical element LC and by a signal on line 718 from logical element LE.

In a second action, at packet arrival time $T_S$, the logical unit LA proceeds as follows:
1) Case 1: The first flit of a packet $PKT_A$ arrives at logical element LA on line 704; the header bit $H_W$ of $PKT_A$ is set to one indicating that logical element LD is on a path to the target output of $PKT_A$; and the logical element LA register CR=2 indicating that logical element LD will not receive a packet from logical element LC at time $T_{S+1}$. In this case, logical element. LA sends a signal down line 608 to set the crossbar to the bar state. Then logical element LA sends the first flit of packet $PKT_A$ through the crossbar to arrive at logical element LD at time $T_{S+1}$. Then logical element LA sends a signal through line 604 to set the CL register of logical element LB to 1.
2) Case 2: The conditions of Case 1 do not occur and the CR register of logical element LA is set to 2 indicating that logical element LC is not sending a packet to arrive at logical element LD at time $T_{S+1}$. In this case, logical element LA sends a signal trough line 604 to set the CL register of logical element LB to 2.
3) Case 3: The conditions of Case 1 do not occur and the CR register of logical element LA is set to one indicating that logical element LC is sending a packet to arrive at logical element LD at time $T_{S+1}$. In this case, logical element LA sends a signal trough line 604 to set the CL register of logical element LB to 3.

In a third action, at packet arrival time $T_S$, the logical unit LB proceeds as follows:

1) Case 1: The first flit of a packet $PKT_B$ arrives at logical element LB on line 702; the header bit $H_W$ of $PKT_B$ is set to zero and the logical element LB register CR=2 indicating that logical element LF will not receive a packet from logical element LE at time $T_{S+1}$. In this case, logical element LB sends a first flit of $PKT_B$ to the crossbar to travel through the crossbar after the crossbar has been set to the bar state so as to arrive at logical element LF at time $T_{S+1}$. Then logical element LB sends a control signal through line 604 to set the CL register of logical element LA to 1.
2) Case 2: The conditions of Case 1 do not occur and the CR register in logical element LB is set to 2 indicating that logical element LE is not sending a packet to arrive at logical element LF at time $T_{S+1}$. In this case, logical element LB sends a signal through line 606 to set the CL register of logical element LA to 2.
3) Case 3: The conditions of Case 1 do not occur and the CR register in logical element LB is set to 3 indicating that logical element LE is sending a packet to arrive at logical element LF at time $T_{S+1}$. In this case, logical element LB sends a signal through line 606 to set the CL register of logical element LA to 3.

In a fourth action, if logical element LA has already set the crossbar to the bar state, then logical element LA takes no further action. If logical element LA has not set the crossbar to the bar state, then logical element LA examines its CL register after the CL register has been set to a non-zero value. If the CL register contains a 1, then logical element LA sets the crossbar to the bar state. If the CL register contains a number distinct from 1, then logical element LA sets the crossbar to the cross state.

In a fifth action, at this point the logic at logical element LA has information of the state of the crossbar and logical element LA proceeds as follows:

1) Case 1: There is no packet flit in logical element LA at time $T_S$, implying that no further action is required of logical element LA.
2) Case 2: The first flit of a packet $PKT_A$, arrived at logical element LA at time $T_S$. The crossbar is in the bar state, the first flit of a packet $PKT_A$ was sent through the crossbar as described hereinabove implying that no further action is required of logical element LA.
3) Case 3: The first flit of a packet $PKT_A$ arrived at logical element LA at time $T_S$. The crossbar is in the bar state, the first flit of a packet $PKT_A$ was not sent through the crossbar in the second action as described hereinabove implies that the first flit of packet $PKT_A$ is to be sent to delay unit DA. Therefore, logical element LA sends the first flit of $PKT_A$ to delay unit DA.
4) Case 4: The first flit of a packet $PKT_A$ arrived at logical element. LA at time $T_S$. The crossbar is in the cross state, the header bit $H_W$ of $PKT_A$ is set to 0, and the register CL of logical element. LA is set to 2 then the first flit of $PKT_A$ will be sent through the crossbar to arrive at logical element LF at time $T_{S+1}$.
5) Case 5: The first flit of a packet $PKT_A$ arrived at logical element LA at time $T_S$. The crossbar is in the cross state, but the conditions of case 4 do not occur. Then the first flit of $PKT_A$ will be sent to delay unit DA.

In a sixth action, which can be performed simultaneously with fifth action, if either the CL register of logical element LB is set to 1, or LB sets the CL register of logical element LA to 1, then the logic at logical element LA has information that the crossbar is set to the bar state. If neither of these conditions is met, then logical element LA is aware that the crossbar is set to the cross state. Logical element LB proceeds as follows:

1) Case 1: No packet flit is in logical element LB at time $T_S$, implying that no further action is required of logical element LB.
2) Case 2: The first flit of a packet $PKT_S$ arrived at logical element LB at time $T_S$. The crossbar is in the bar state, the first flit of a packet $PKT_B$ was sent through the crossbar as described hereinabove, implying that no further action is required of logical element LB.
3) Case 3: The first flit of a packet $PKT_B$ arrived at logical element LB at time $T_S$. The crossbar is in the bar state, the first flit of a packet $PKT_B$ was not sent through the crossbar in the second action as described hereinabove, implying that the first flit of packet $PKT_B$ is to be sent to delay unit DB.
4) Case 4: The first flit of a packet $PKT_S$ arrived at logical element LB at time $T_S$. The crossbar is in the cross state, the header bit $H_W$ of $PKT_B$ is set to 1, and the register CL of logical element. LB is set to 2 then the first flit of $PKT_S$ will be sent through the crossbar to arrive at logical element LD at time $T_{S+1}$.
5) Case 5: The first flit of a packet $PKT_B$ arrived at logical element LB at time $T_B$. The crossbar is in the cross state, but the conditions of case 4 do not occur. The first flit of $PKT_A$ will be sent to delay unit DB.

In the illustrative example, the priority is given to the bar state over the cross state. In another example priority can be given to the cross state. In still another example priority can be given to logical element LA over logical element LB or to logical element LB over logical element LA.

The multiplexer elements Improve structure compactness and performance by reducing the amount of interconnection paths between nodes. In a different embodiment, the multiplexers may be omitted. Referring to FIG. 7, notice that MC 738 and interconnect line 734 can be eliminated by connecting interconnect line 732 to a first input of logic unit LD and connecting interconnect line 622 to a second input of logic unit LD. In another simplified embodiment, a single LDM module can serve as a node of a switch. In this case, the crossbar in the node switching node can be omitted. In another more complex embodiment, a switching node can include a number on LDM modules and a switch where the number N of LDM modules is not equal to one or two and the switch is of radix N.

The structures and systems disclosed herein include significant improvements over the systems described in the referenced U.S. Pat. No. 5,996,020, 6,289,021, and 6,754,207, including one or more of the following advantageous properties: 1) improved signal integrity even at high clock rates, 2) increased bandwidth, and 3) lower latency.

Improvements include one or more of: 1) a bus-wide data path; 2) all header bits sufficient to route data through the switch are contained in flit $F_0$; and 3) the signal is cleaned up at each logic unit and each delay unit of an LDM module.

Figure 9A:
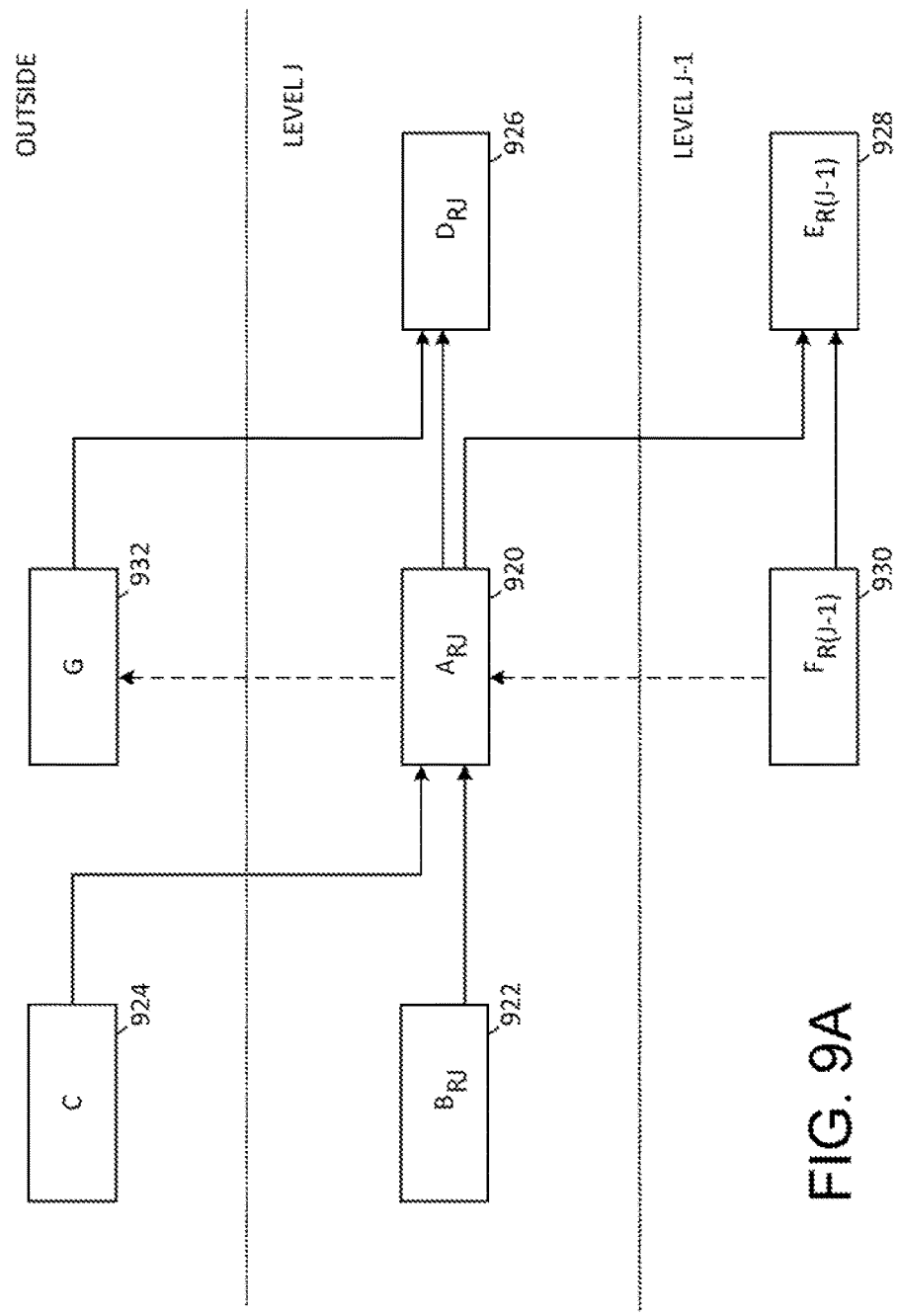
Figure 9B:
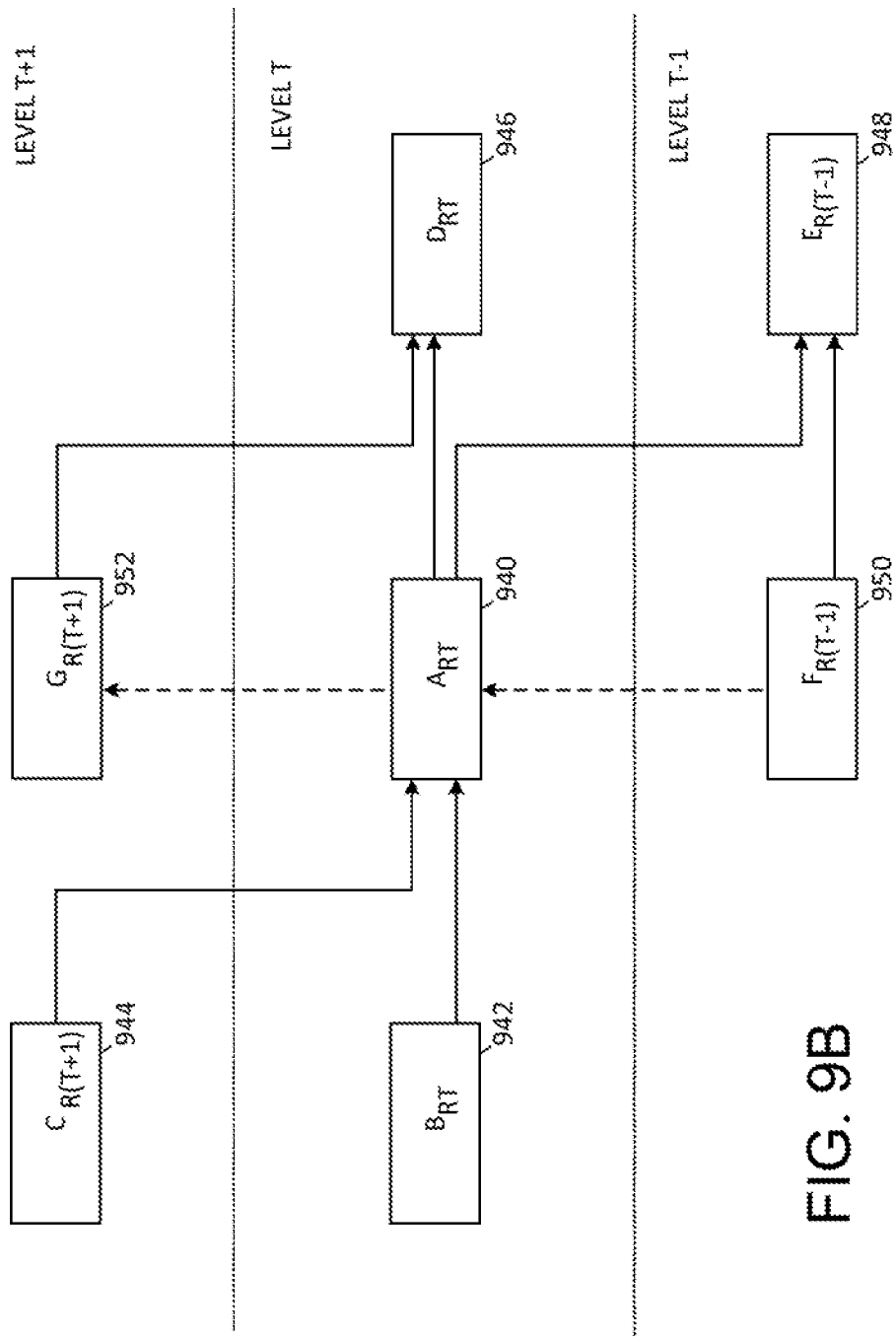

FIGS. 9A, 9B and 9C are schematic block diagrams that show interconnections of nodes on various levels of the interconnect structure. FIG. 9A shows a node $A_{RJ}$ 920 on a ring R of outermost level J and the interconnections of node $A_{RJ}$ 920 to node $B_{RJ}$ 922, device C 924, node $D_{RJ}$ 926, node $E_R(J-1)$ 928, node $F_R(J-1)$ 930 and device G 932. FIG. 9B shows a node $A_{RT}$ 940 on a ring R of a level J and the interconnections of node $A_{RT}$ 940 to node $B_{RT}$ 942, node $C_R(T+1)$ 944, node $D_{RT}$ 946, node $E_R(T-1)$ 948, node $F_R(T-1)$ 950 and node $G_R(T+1)$ 952. FIG. 9C shows a node $A_{R0}$ 960 on a ring R of innermost level 0 and the interconnections of node $A_{R0}$ 960 to node $B_{R0}$ 962, node $C_{R1}$ 964, node $D_{R0}$ 966, device E 968 and node $G_{R1}$ 972.

FIGS. 9A, 9B and 9C show topology of an interconnect structure. To facilitate understanding, the structure can be considered a collection of concentric cylinders in three dimensions r, Θ and z. Each node or device has a location designated (r, Θ, z) which relates to a position (r, 2π Θ/K, z) in three-dimensional cylindrical coordinates where radius r is an integer which specifies the cylinder number from 0 to J, angle Θ is an integer which specifies the spacing of nodes around the circular cross-section of a cylinder from 0 to K−1, and height z is a binary integer which specifies distance along the z-axis from 0 to $2^{J-1}$. Height z is expressed as a binary number because the interconnection between nodes in the z-dimension is most easily described as a manipulation of binary digits. Accordingly, an interconnect structure can be defined with respect to two design parameters J and K.

In FIGS. 9A, 9B and 9C interconnections are shown with solid lines with arrows indicating the direction of message data flow and dashed lines with arrows indicating the direction of control message flow. In summary, for nodes A, B and D and nodes or devices C, E, F, G:
 1) A is on level t=r;
 2) B and C send data to A;
 3) D and E receive data from A;
 4) F sends a control signal to A;
 5) G receives a control signal from A;
 6) B and D are on level T;
 7) B is the immediate predecessor of A;
 8) D is the immediate successor to A; and
 9) C, E, F and G are not on level T.

Positions in three-dimensional cylindrical notation of the various nodes and devices is as follows:
 1) A is positioned at node N(r, Θ, z);
 2) B is positioned at node N(r, Θ−1, $H_T$(z));
 3) C is either positioned at node N(r+1, Θ−1, z) or is outside the interconnect structure;
 4) D is positioned at node N(r, Θ+1, $h_T$(z));
 5) E is either positioned at node N(r−1, Θ+1, z) or is outside the interconnect structure and the same as device F;
 6) F is either positioned at node N(r−1, Θ, $H_{T-1}$(z)) or is outside the interconnect structure and the same as device E;
 7) G is either positioned at node N(r+1, Θ, $h_T$(z)) or is outside the interconnect structure.

Note that the terms Θ+1 and Θ−1 refer to addition and subtraction, respectively, modulus K.

In this notation, (Θ−1)mod K is equal K when Θ is equal to 0 and equal to Θ−1 otherwise. The conversion of z to $H_r$(z) on a level r is described for z=[$z_{J-1}$, ..., $z_{J-2}$, ..., $z_r$, $z_{r-1}$, ..., $z_2$, $z_1$, $z_0$] by reversing the order of low-order z bits from $z_{r-1}$ to $z_0$ into the form z=[$z_{J-1}$, $z_{J-2}$, ..., $z_r$, $z_0$, $z_1$, $z_2$, ..., $z_{r-1}$], subtracting one (modulus $2^r$) and reversing back the low-order z bits. Similarly, (Θ+1)mod K is equal 0 when Θ is equal to K−1 and equal to Θ+1 otherwise. The conversion of z to hr (z) on a level r is described for z=[$z_{J-1}$, $z_{J-2}$, ..., $z_r$, $z_{r-1}$, ..., $z_2$, $z_1$, $z_0$] by reversing the order of low-order z bits from $Z_{r-1}$ to $z_0$ into the form z=[$z_{J-1}$, $z_{J-2}$, ..., $z_r$, $z_0$, $z_1$, $z_2$, ..., $z_{r-1}$], adding one (modulus $2^r$) and reversing back the low-order z bits.

In accordance with one embodiment of the system depicted in FIGS. 9A, 9B and 9C, the interconnect structure can include a plurality of nodes arranged in a structure comprising a hierarchy of levels from a source level to a destination level; plurality of nodes spanning a cross-section of a level: a plurality of nodes in a cross-section span. The level of a node can be determined entirely by the position of the node in the structure; and a plurality of interconnect lines coupling the nodes in the structure. For a node N on a level L: (1) a plurality of message input interconnect lines are coupled to a node on a previous level L+1; (2) a plurality of message input interconnect lines are coupled to a node on the level L; (3) a plurality of message output interconnect lines are coupled to a node on the level L; (4) a plurality of message output interconnect lines are coupled to a node on a subsequent level L−1; (5) a control input interconnect line is coupled to the message output interconnect line of a node on the level L−1; and (6) a switch is coupled to receive a message on the control input interconnect line and, in accordance with the message, to selectively transmit a message without buffering on the plurality of message output interconnect lines coupled to the subsequent level L−1 node or on the plurality of message output interconnect lines coupled to the level L.

In accordance with another embodiment of the system depicted in FIGS. 9A, 9B and 9C, the interconnect structure can include a plurality of nodes and a plurality of interconnect lines coupling the nodes. A node X of the plurality of nodes can include a plurality of message input interconnect lines coupled to a node A distinct from the node X; and a plurality of message input interconnect lines coupled to a node B distinct from the node A and the node X. The node X accepts a message input from the node A and a message input from the node B with a control signal communicating between the node A and the node B for determining a priority relationship between conflicting messages. The control signal can enforce the priority relationship between the sending of a message from the node A to the node X and the sending of a message from the node B to the node X.

In accordance with a further embodiment of the system depicted in FIGS. 9A, 9B and 9C, the interconnect structure can include a plurality of nodes and a plurality of interconnect lines in an interconnect structure selectively coupling the nodes in a hierarchical multiple level structure. The hierarchical multiple level structure can be arranged to include a plurality of J+1 levels in an hierarchy of levels arranged from a lowest destination level $L_0$ to a highest level $L_j$ which is farthest from the lowest destination level $L_0$. The level of a node can be determined entirely by the position of the node in the structure with the interconnect structure transmitting a message M in a plurality of discrete time steps. A message M moving in a time step and the interconnect structure having interconnections to move the message M in one of three ways in the time step including: (1) the message M enters a node in the interconnect structure from a device external to the interconnect structure; (2) the message M exits the interconnect structure to a designated output buffer; and (3) the message M either moves from a node U on a level $L_k$ to a different node V on the same level $L_k$ or moves from the node U to a node W on a level $L_i$ where k is greater than i so that the level $L_i$ is closer to the destination level $L_0$ than the level $L_k$.

In accordance with other embodiments of the system depicted in FIGS. 9A, 9B and 9C, the interconnect structure can include a plurality of nodes; and a plurality of interconnect lines selectively coupling the nodes in a hierarchical multiple level structure with the level of a node being determined entirely by the position of the node in the structure in which data moves only unilaterally from a source level to a destination level or laterally along a level of the multiple level structure. Data messages can be transmitted through the multiple level structure from a source node to a designated destination node. A level of the multiple levels can include one or more groups of nodes. The data message can be transmitted to a group of the one or more groups of nodes that is en route to the destination node. A group of the one or more groups can include a plurality of nodes. The data message can be transmitted to a node N of the plurality of nodes of a group unilaterally toward the destination level if the node is not blocked and otherwise the data message being transmitted laterally if the node is blocked.

In accordance with further embodiments of the system depicted in FIGS. 9A, 9B and 9C, the interconnect structure can include a plurality of nodes and a plurality of interconnect lines L interconnecting communication devices at the plurality of nodes. The nodes can include communication devices that communicate messages in a sequence of discrete time steps including receiving messages and sending messages. A node N of the plurality of nodes can include: (1) a connection to a plurality of interconnect lines LUN for transmitting a message from a device U to the node N; (2) a connection to a plurality of interconnect lines LVN for transmitting a message from a device V to the node N; and (3) the network which has a precedence relationship PN(U, V) relating to the node N and the devices U and V such that the device U has precedence over the device V in sending a message to the node N so that for a message MU at the device U that is directed to the node N via the plurality of interconnect lines LUN at a time step t and a message MV at the device V that is directed to the node N via the plurality of interconnect lines LVN also at a time step t. The message MU is successfully sent to the node N and the node V uses a control signal to decide where to send the message MV.

In accordance with still further embodiments of the system depicted in FIGS. 9A, 9B and 9C, the interconnect structure can include a plurality of nodes N and a plurality of interconnect lines L connecting the plurality of nodes N in a predetermined pattern. The interconnect lines carry messages M and control signals C. The messages M and control signals C can be received by a node of the plurality of nodes at a discrete time step t and the messages M can be moved to subsequent nodes of the plurality of nodes in an immediately subsequent discrete time step t+1. The plurality of interconnect lines L connecting the plurality of nodes N can include: (1) a node NA having a message input interconnection for receiving a message MA, (2) a control input interconnection for receiving a control signal CA, (3) a direct message output interconnection to a node ND, (4) a direct message output interconnection to a node NE, (5) a direct control output interconnection to a device G. A control logic for determining whether the message MA is sent to the node ND or the node NE can based on: (1) the control signal CA; (2) a location of the node NA within the plurality of interconnect lines L; and (3) a routing information contained in the message MA.

In still another embodiment, the interconnect structure can comprise a plurality of nodes N and a plurality of interconnect lines L connecting the plurality of nodes N in a predetermined pattern. The plurality of interconnect lines L connecting the plurality of nodes N can include a node NA having a direct message input interconnection for receiving a message MA and having a plurality of direct message output interconnections for transmitting the message MA to a plurality of nodes including a selected node NP being most desired for receiving the message MA. The selected node NP can be determined only by routing information in a header of the message MA and the position of the node NA within the plurality of interconnect lines L. The selected node NP has a plurality of direct message input interconnections for receiving a message MP from a plurality of nodes including a priority node NB which has priority for sending a message to the selected node NP. The priority node NB can be determined by position of the node NB within the plurality of interconnect lines L so that: (1) if the node NA is the same as the node NB, then the message MA is the message MP and is sent from the node NA to the node NP; and (2) if the node NA is not the same as the node NB and the node NB directs a message MB to the node NP, then the message MB is sent from the node NB to the node NP.

In additional embodiments, the interconnect structure can comprise a network capable of carrying a plurality of messages M concurrently comprising a plurality of output ports P; a plurality of nodes N, the individual nodes N including a plurality of direct message input interconnections and a plurality of direct message output interconnections; and a plurality of interconnect lines. The individual nodes N pass messages M to predetermined output ports of the plurality of output ports P. The predetermined output ports P are designated by the messages M. The plurality of interconnect lines can be configured in an interconnect structure selectively coupling the nodes in a hierarchical multiple level structure arranged to include a plurality of J+1 levels in an hierarchy of levels arranged from a lowest destination level L0 to a highest level LJ which is farthest from the lowest destination level L0, the output ports P being connected to nodes at the lowest destination level L0. The level of a node can be determined entirely by the position of the node in the structure. The network can include a node NA of the plurality of nodes N, a control signal operating to limit the number of messages that are allowed to be sent to the node NA to eliminate contention for the predetermined output ports of the node NA so that the messages M are sent through the direct message output connections of the node NA to nodes NH that are a level L no higher than the level of the node NA, the nodes NH being on a path to the designated predetermined output ports P of the messages M.

In accordance with an embodiment of the system depicted in FIGS. 9A, 9B and 9C, the interconnect structure can include a plurality of nodes and a plurality of interconnect lines in an interconnect structure selectively coupling the nodes in a hierarchical multiple level structure. The multiple level structure can be arranged to include a plurality of J+1 levels with J an integer greater than 0 in an hierarchy of levels arranged from a lowest destination level L0 to a highest level LJ with the level of a node being determined entirely by the position of the node in the structure, the interconnect structure transmitting a plurality of multiple-bit messages entering the interconnect structure unsorted through a plurality of input ports. An individual message M of the plurality of messages can be self-routing. The individual message M moves in a plurality of ways including three ways which are sufficient for the message M to exit the interconnect structure through an output port designated by the message M. The three ways are: (1) the message M enters a node in the interconnect structure from a device external to the interconnect structure, the message M designating one or more designated output ports; (2) the message M moves through a node in the interconnect structure without buffering to a designated output port; and (3) the message M moves either through a node U on a level Lk of the interconnect structure without buffering to a different node V on the same level Lk or moves through the node U on a level Lk of the interconnect structure without buffering to a node W on a level Li nearer in the hierarchy to the destination level L0 than the level Lk.

In accordance with still other embodiments of the system depicted in FIGS. 9A, 9B and 9C, the interconnect structure can include a plurality of nodes and a plurality of interconnect lines in an interconnect structure selectively coupling the nodes in a structure. The interconnect structure transmits a plurality of multiple-bit messages entering the interconnect structure unsorted through a plurality of input ports. An individual message M of the plurality of messages can be self-routing. The interconnect structure can include: (1) a node NE having a first data input interconnection from a node NA and a second data input interconnection from a node NF distinct from the node NA; and (2) a control interconnection between the node NA and node NF for carrying a control signal to resolve contention for sending messages to the node NE. The control signal can be supplied from the node NA or the node NF each distinct from the node NE with which messages are communicated.

In accordance with further other embodiments of the system depicted in FIGS. 9A, 9B and 9C, the interconnect structure can include a plurality of nodes and a plurality of interconnect lines in an interconnect structure selectively coupling the nodes in a hierarchical multiple level structure. The multiple level structure can be arranged to include a plurality of J+1 levels with J an integer greater than 0 in an hierarchy of levels arranged from a lowest destination level $L_0$ to a highest level $L_J$. The interconnect structure receives a plurality of multiple bit messages unsorted through a plurality of input ports and transmitting the multiple bit messages. An individual message M of the plurality of messages can be self-routing and moves through nodes using wormhole routing in which only a portion of the multiple-bits of a message are in transit between two nodes. The multiple-bit message extends among multiple nodes. An individual message M moves in a plurality of ways including four ways which are sufficient for the message M to exit the interconnect structure through an output port designated by the message M. The four ways are: (1) the message M enters a node in the interconnect structure from a device external to the interconnect structure, the message M designating one or more designated output ports; (2) the message M moves through a node in the interconnect structure without buffering to a designated output port; (3) the message M moves through a node on a level $L_k$ of the interconnect structure without buffering to a different node on the same level $L_k$; and (4) the message M moves through a node on a level Lk of the interconnect structure without buffering to a node on a level $L_i$ nearer in the hierarchy to the destination level $L_0$ than the level $L_k$.

In accordance with further other embodiments of the system depicted in FIGS. 9A, 9B and 9C, the interconnect structure can include a plurality of nodes and a plurality of interconnect lines in an interconnect structure selectively coupling the nodes in a structure. The interconnect structure receives a plurality of multiple bit messages unsorted through a plurality of input ports and transmits the multiple bit messages. An individual message M of the plurality of messages can be self-routing and move through nodes using wormhole routing in which only a portion of the multiple bits of a message are in transit between two nodes with the multiple-bit message extending among multiple nodes. The interconnect structure can include a node $N_E$ that has a first data input interconnection from a node $N_A$ and a second data input interconnection from a node $N_F$: and a control interconnection between the node $N_A$ and node $N_F$ that resolves contention for sending messages to the node $N_E$.

In accordance with further other embodiments of the system depicted in FIGS. 9A, 9B and 9C, the interconnect structure can include a plurality of nodes with each node having a plurality of input ports and a plurality of output ports, a logic associated with the plurality of nodes, and a node X included in the plurality of nodes and having an output port opx. The node X can have a set of input terminals IPX wherein a logic associated with the node X can send messages entering an input terminal of the set IPX to the output port opx. The logic associated with the node X can be operational wherein if a message $M_P$ arrives at an input port p of input port set IPX and a path exists from the output port opx to a target of message $M_P$, then one of the messages arriving at input port set IPX will be sent to output port opx so long as the output port opx is not blocked by a message that is not traveling through the node X.

In still further embodiments, the interconnect structure can comprise a plurality of interconnected nodes including distinct nodes $F_W$, $F_B$, and $F_X$; means for sending a plurality of messages through the plurality of nodes including sending a set of messages $S_W$ through the node $F_W$; and means for sending information i concerning routing of the messages in the message set $S_W$ through the node $F_W$ including routing a portion of the messages in the message set $S_W$ through the node $F_W$ to the node $F_X$. The interconnect structure can further comprise means associated with the node $F_B$ for using the information I to route messages through the node $F_8$.

In other embodiments, the interconnect structure can comprise a plurality of nodes including a node K a node set T, and a node set S including nodes Y and Z; a plurality of interconnect paths connecting the nodes; a plurality of output ports coupled to the plurality of nodes; and logic that controls flow of data through the nodes to the output ports. The logic controls data flow such that: (1) the node X is capable of sending data to any node in the set S; (2) the node set T includes nodes that can alternatively pass data that are otherwise controlled by the logic to flow through the node X; (3) any output port that can access data passing through the node X can also access data passing through the node Y; (4) the plurality of output ports include an output port O that can access data passing through the node X but cannot access data passing through the node Z; and (5) the logic controls flow of data through the node X to maximize the number of data messages that are sent through a node in the set T such that the number of output ports accessible from the node in the set T is less than the number of output ports that are accessible from the node X.

Referring to FIG. 10, a timing diagram illustrates timing of message communication in the described interconnect structure. In various embodiments of the interconnect structure, control of message communication is determined by timing of message arrival at a node. A message packet, such as a packet 1100 shown in FIG. 11, includes a header 1110 and a payload 1120. The header 1110 includes a series of bits 1112 designating the target ring in a binary form. When a source device CU($\Theta_1,z_1$) at an angle. $\Theta_1$ and height $z_1$ sends a message packet M to a destination device CU($\Theta_2,z_2$) at an angle. $\Theta_2$ and height $z_2$, the bits 1112 of header 1110 are set to the binary representation of height $z_2$.

A global clock servicing an entire interconnect structure keeps integral time modulus K where, again, K designates the number of nodes n at a cylinder height z. There are two constants $\alpha$ and $\beta$ such that the duration of $\alpha$ exceeds the duration of $\beta$ and the following five conditions are met. First, the amount of time for a message M to exit a node N(T,$\Theta$+1,$h_T(z)$) on level T after exiting a node N(T,$\Theta$,z) also on level T is $\alpha$. Second, the amount of time for a message M to exit a node $N(T-1,\Theta+1,z)$ on level $T-1$ after exiting a node $N(T,\Theta,z)$ on level T is $\alpha-\beta$. Third, the amount of time for a message to travel from a device CU to a node $N(r,\Theta,z)$ is $\alpha-\beta$. Fourth, when a message M moves from a node $N(r,\Theta,z)$ to a node $N(r,\Theta+1,h_r(z))$ in time duration $\alpha$, the message M also causes a control code to be sent from node $N(r,\Theta,z)$ to a node $N(r+1,\Theta,h_r(z))$ to deflect messages on the outer level $r+1$. The time that elapses from the time that message M enters node $N(r,\Theta,z)$ until the control bit arrives at node $N(r+1,\Theta,h_{r+1}(z))$ is time duration $\beta$. The aforementioned fourth condition also is applicable when a message M moves from a node $N(J,\Theta,z)$ to a node $N(J,\Theta+1,h_J(z))$ at the outermost level J so that the message M also causes a control code to be sent from node $N(J,\Theta,z)$ to the device D outside of the network such that D sends data to $N(J, \Theta+1,h_J(z))$. In one embodiment, $D=CU(\Theta+1, h_J(z))$. The time that elapses from the time that message M enters node $N(r,\Theta,z)$ until the control bit arrives at device $CU(\Theta,z)$ is time duration $\beta$. Fifth, the global clock generates timing pulses at a rate of $\alpha$.

When the source device $CU(\Theta_1,z_1)$ sends a message packet M to the destination device $CU(\Theta_2,z_2)$, the message packet M is sent from a data output terminal of device $CU(\Theta_1,z_1)$ to a data input terminal of node $N(J,\Theta_1,z_1)$ at the outermost level J. Message packets and control bits enter nodes $N(T,\Theta,z)$ on a level T at times having the form $n\alpha+L\beta$ where n is a positive integer. The message M from device $CU(\Theta_1,z_1)$ is sent to the data input terminal of node $N(J, \Theta_1,z_1)$ at a time $t_0-\beta$ and is inserted into the data input terminal of node $N(J,\Theta_1,z_1)$ at time $t_0$ so long as the node $N(J,\Theta_1,z_1)$ is not blocked by a control bit resulting from a message traversing on the level J. Time $t_0$ has the form $(\Theta_2-\Theta_1)\alpha+J\beta$. Similarly, there is a time of the form $(\Theta_2-\Theta_1)\alpha+J\beta$ at which a data input terminal of node $N(J,\Theta_1,z_1)$ is receptive to a message packet from device $CU(\Theta_1,z_1)$.

Nodes $N(T,\Theta,z)$ include logic that controls routing of messages based on the target address of a message packet M and timing signals from other nodes. A first logic switch (not shown) of node $N(T,\Theta,z)$ determines whether the message packet M is to proceed to a node $N(T-1, \Theta+1,z)$ on the next level $T-1$ or whether the node $N(T-1, \Theta+1,z)$ is blocked. The first logic switch of node $N(T,\Theta,z)$ is set according to whether a single-bit blocking control code sent from node $N(T-1,\Theta,H_{T-1}(z))$ arrives at node $N(T,\Theta,z)$ at a time $t_0$. For example, in some embodiments the first logic switch takes a logic 1 value when a node $N(T-1,\Theta+1,z)$ is blocked and a logic 0 value otherwise. A second logic switch (not shown) of node $N(T,\Theta,z)$ determines whether the message packet M is to proceed to a node $N(T-1,\Theta+1,z)$ on the next level $T-1$ or whether the node $N(T-1,\Theta+1\ z)$ is not in a suitable path for accessing the destination device $CU(\Theta_2,z_2)$ of the header of the message packet M. The header of the message packet M includes the binary representation of destination height $z_2(z_2(J), z_2(J-1), \ldots z_2(T), \ldots, z_2(1), z_2(0)$. The node $N(T,\Theta,z)$ on level T includes a single-bit designation $z_T$ of the height designation $z$ ($z_J, z_{J-1}, \ldots, z_T, \ldots, z_1, z_0$). In this embodiment, when the first logic switch has a logic 0 value and the bit designation $z_2(T)$ of the designation height is equal to the height designation $z_T$, then the message packet M proceeds to the next level at node $N(T-1,\Theta+1,z)$ and the destination height bit $z_2(T)$ is stripped from the header of message packet M. Otherwise, the message packet M traverses on the same level T to node $N(T,\Theta+1,h_T(z))$. If message packet M proceeds to node $N(T-1,\Theta+1,z)$, then message packet M arrives at a time $t_0+(\alpha-\beta)$ which is equal to a time $(z_2-z_1+1)\alpha+(J-1)\beta$. If message packet M traverses to node $N(T,\Theta+1,h_T(z))$, then message packet M arrives at a time $t_0+\alpha$, which is equal to a time $(z_2-z_1+1)\alpha+J\beta$. As message packet. M is sent from node $N(r,\Theta,z)$ to node $N(T,\Theta+1,h_T(z))$, a single-bit control code is sent to node $N(T+1,\Theta,h_T(z))$ (or device $CU(\Theta,z)$) which arrives at time $t_0+\beta$. This timing scheme is continued throughout the interconnect structure, maintaining synchrony as message packets are advanced and deflected.

The message packet M reaches level zero at the designated destination height $z_2$. Furthermore, the message packet M reaches the targeted destination device $CU(\Theta_2,z_2)$ at a time zero modulus K (the number of nodes at a height z). If the targeted destination device $CU(\Theta_2,z_2)$ is ready to accept the message packet M, an input port is activated at time zero modulus K to accept the packet. Advantageously, all routing control operations are achieved by comparing two bits, without ever comparing two multiple-bit values. Further advantageously, at the exit point of the interconnect structure as message packets proceed from the nodes to the devices, there is no comparison logic, if a device is prepared to accept a message, the message enters the device via a clock-controlled gate.

Figure 11:
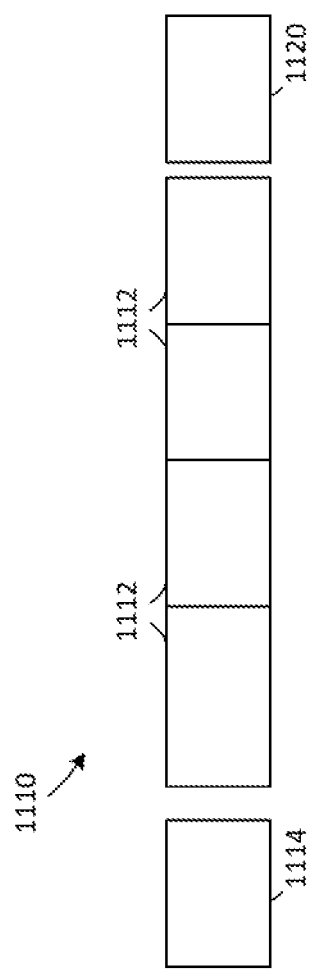
FIG. 11 is a pictorial representation illustrating the format of a message packet including a header and payload.

Referring to FIGS. 10 and 11, an embodiment of the interconnect structure can comprise a plurality of nodes arranged in a topology of three dimensions and means for transmitting a message from a node N to a target destination. The means for transmitting a message from a node N to a target destination can comprise means for determining whether a node en route to the target destination in the second and third dimensions and advancing one level toward the destination level of the first dimension is blocked by another message; and means for advancing the message one level toward the destination level of the first dimension when the en route node is not blocked, and means for moving the message in the second and third dimensions along a constant level in the first dimension otherwise. The means for transmitting a message from a node N to a target destination can further comprise means for specifying the first dimension to describe a plurality of levels, the second dimension to describe a plurality of nodes spanning a cross-section of a level, and the third dimension to describe a plurality of nodes in the cross-section of a level; means for sending a control signal from a node on the level of the en route node to the node N in the first dimension, the control signal specifying whether the node en route is blocked; means for timing transmission of a message using a global clock specifying timing intervals to keep integral time modulus the number of nodes in a cross-section of a level; and means for setting a first time interval $\alpha$ for moving the message in the second and third dimensions. The means for transmitting a message from a node N to a target destination can still further comprise means for setting a second time interval $\alpha-\beta$ for advancing the message one level toward the destination level, the global clock specifying a global time interval equal to the second time interval, the first time interval being smaller than the global time interval; and means for setting a third time interval for sending the control signal from the node on the level of the en route node to the node N, the third time interval being equal to $\beta$.

Terms "substantially", "essentially", or "approximately", that may be used herein, relate to an industry-accepted variability to the corresponding term. Such an industry-accepted variability ranges from less than one percent to twenty percent and corresponds to, but is not limited to, materials, shapes, sizes, functionality, values, process variations, and the like. The term "coupled", as may be used herein, includes direct coupling and indirect coupling via another component or element where, for indirect coupling, the intervening component or element does not modify the operation. Inferred coupling, for example where one element is coupled to another element by inference, includes direct and indirect coupling between two elements in the same manner as "coupled".

The illustrative pictorial diagrams depict structures and process actions in a manufacturing process. Although the particular examples illustrate specific structures and process acts, many alternative implementations are possible and commonly made by simple design choice. Manufacturing actions may be executed in different order from the specific description herein, based on considerations of function, purpose, conformance to standard, legacy structure, and the like.

While the present disclosure describes various embodiments, these embodiments are to be understood as illustrative and do not limit the claim scope. Many variations, modifications, additions and improvements of the described embodiments are possible. For example, those having ordinary skill in the art will readily implement the steps necessary to provide the structures and methods disclosed herein, and will understand that the process parameters, materials, shapes, and dimensions are given by way of example only. The parameters, materials, and dimensions can be varied to achieve the desired structure as well as modifications, which are within the scope of the claims. Variations and modifications of the embodiments disclosed herein may also be made while remaining within the scope of the following claims.

What is claimed is:

1. An apparatus, comprising:
   switching circuitry that includes a first logic element, a second logic element, a third logic element, and one or more fourth logic elements, wherein the first logic element is coupled to route first packet data to the second logic element or the third logic element, wherein target information for the first packet data indicates the third logic element as a desired next target for the first packet data, and wherein the first packet data includes multiple bits transmitted in parallel;
   wherein the first logic element is configured to forward the first packet data to the third logic element based on determining that the one or more fourth logic elements are not routing packet data to the third logic element; and
   wherein the first logic element is configured to forward the first packet data to the second logic element based on control signaling from the one or more fourth logic elements indicating that at least one of the one or more fourth logic elements is routing second packet data to the third logic element.

2. The apparatus of claim 1, wherein the switching circuitry is configured to route data such that, subsequent to the first logic element forwarding first packet data to the second logic element, the second logic element is configured to receive control signaling from one or more fifth logic elements that do not receive the second packet data, such that the second packet data cannot block the first packet data from being forwarded to a desired sixth logic element indicated as a desired next target for the first packet data by the target information.

3. The apparatus of claim 1, wherein the switching circuitry includes multiple logical levels and wherein packet data enters at one or more of the logical levels and propagates via one or more of the levels to leave at one or more lower logical levels;
   wherein the first and second logic elements are in a first level; and
   wherein the third and fourth logic elements are in a second, lower level.

4. The apparatus of claim 3, wherein each of the multiple logic levels is configured to forward packet data to either a logic element on the same logical level or a logic element on a next-lowest logical level based on target information and control information.

5. The apparatus of claim 4, wherein the first logic element is never blocked from forwarding packet data to another logic element on the same logical level.

6. The apparatus of claim 1, where the first packet data is a multi-bit portion of a first packet received by the switching circuitry, wherein the multi-bit portion has a first number of bits, and wherein the switching circuitry is configured to route packet data using data busses configured to transmit the first number of bits in parallel.

7. The apparatus of claim 1, wherein the first logic element is included in a node element that includes the first logic element a delay logic element, and multiplexing circuitry, wherein the delay logic element and multiplexing circuitry are configured to route data from the first logic element to the second logic element to synchronize timing of packet data.

8. The apparatus of claim 1, wherein the apparatus is configured to transmit an entire address sub-packet included in the first packet data to each of multiple logic elements in the switching circuitry without discarding bits of the address sub-packet.

9. The apparatus of claim 1, wherein the first packet data is a sub-packet of a packet that includes multiple sub-packets.

10. A method, comprising:
    a first logic element in a switch network receiving first packet data and determining that a third logic element is a desired next target for the first packet data based on target information for the first packet data, wherein the first packet data includes multiple bits transmitted in parallel;
    the first logic element transmitting the first packet data to a second logic element and not the third logic element based on control information indicating that at least one of one or more fourth logic elements is targeting the third logic element;
    the first logic element receiving second packet data and determining that the third logic element is a desired next target for the second packet data based on target information for the second packet data; and
    the first logic element transmitting the second packet data to the third logic element based on control information indicating that the one or more fourth logic elements do not target the third logic element.

11. The method of claim 10, further comprising:
    the switch network routing the first packet data according to a permutation such that, subsequent to the first logic element forwarding packet data to the second logic element, the second logic element receives control signaling from one or more fifth logic elements that do not receive the second packet data, such that the second packet data does block the first packet data from being forwarded to a desired sixth logic element indicated as a desired next target for the first packet data by the target information.

12. The method of claim 10, wherein the switching circuitry includes multiple logical levels and wherein packet data enters at one or more of the logical levels and propagates via one or more of the levels to leave at one or more lower logical levels;

wherein the first and second logic elements are in a first level; and wherein the third and fourth logic elements are in a second, lower level.

13. The method of claim 10, wherein ones of the multiple logic levels forward packet data to either a logic element on the same logical level or a logic element on a next-lowest logical level.

14. The method of claim 10, further comprising delaying the first packet data for a tick between the first logic element and the second logic element.

15. An apparatus, comprising:

multiple logical levels of switch circuitry, wherein packet data enters at one or more of the logical levels and propagates via one or more of the levels to leave at one or more lower logical levels, including:

a first logic element configured to determine whether to forward first packet data to a second logic element that is on the same level as the first logic element or to a third logic element that is on a lower level than the first logic element, based on control signaling from one or more fourth logic elements that are on the lower level, wherein the first packet data includes multiple bits transmitted in parallel;

wherein the one or more fourth logic elements are configured to provide a blocking control signal to the first logic element based on at least one of the one or more fourth logic elements forwarding second packet data to the third logic element, and wherein the first logic element is configured to forward the first packet data to the second logic element in response to the blocking control signal.

16. The apparatus of claim 15, wherein the apparatus is configured to route data packets such that, subsequent to the first logic element forwarding packet data to the second logic element in response to the blocking control signal, the second logic element is configured to receive control signaling from one or more fifth logic elements in the lower level that do not receive the second packet data, such that the second packet data cannot block the first packet data from being forwarded to the lower level by the second logic element.

17. The apparatus of claim 15, wherein the level of the first logic element is arranged in a ring structure such that if the first packet data is blocked at each logic element on the level, it will return to the first logic element.

18. The apparatus of claim 15, wherein each of the multiple logic levels is configured to forward packet data to either a logic element on the same logical level or a logic element on a next-lowest logical level.

19. The apparatus of claim 15, wherein the first packet data is a sub-packet of a packet that includes multiple sub-packets.

20. The apparatus of claim 15, wherein the first packet data is a multi-bit portion of a first packet received by the switching circuitry, wherein the multi-bit portion has a first number of bits, and wherein the switching circuitry is configured to route packet data using data busses configured to transmit the first number of bits in parallel.

21. The apparatus of claim 15, wherein the first logic element is included in a node element that includes the first logic element a delay logic element, and multiplexing circuitry, wherein the delay logic element and multiplexing circuitry are configured to route data from the first logic element to the second logic element to synchronize timing of packet data.

22. The apparatus of claim 15, wherein the level of the first logic element includes a plurality of logic elements configured to forward packet data to the lower level, if not blocked by one or more other logic elements.

23. An apparatus comprising:

switching circuitry that includes a first logic element, a second logic element, a third logic element, and one or more fourth logic elements, wherein the first logic element is coupled to route a first packet to the second logical element or the third logic element and wherein target information for the first packet indicates that the third logic element as a desired next target for the first packet;

wherein the one or more fourth logic elements are configured to a control signal that indicates whether or not the first logic element is blocked from sending the first packet to the third logic element;

wherein the first logic element is configured to, in response to determining that that it is not blocked, forward the first packet to the third logic element; and wherein the first logic element is configured to, in response to determining that it is blocked based on the control signal, forward the first packet to the second logic element.

24. The apparatus of claim 23, wherein the one or more fourth logic elements are configured to block the first logic element, using the control signal, when sending a packet to the third logic element.

25. The apparatus of claim 23, wherein the first packet is subdivided into a number of sub-packets, wherein the first logic element and the one or more fourth logic elements are configured to forward a sub-packet at a time, and wherein each sub-packet in the first packet is sent via the same path through logic elements of the switching circuitry based on routing of the first sub-packet in the first packet.

26. The apparatus of claim 23, wherein the second logic element is configured to receive blocking control information, from one or more fifth logic elements that indicate whether it is blocked from forwarding data to a sixth logic element, wherein packet data is routed in the switching circuitry such that a packet that blocks the first packet from being forwarded from the first logic element to the third logic element cannot block the second logic element from forwarding data to the sixth logic element.

* * * * *